Feb. 20, 1968 L. W. MILLS 3,370,228
TIME MEASUREMENT DEVICE ARRANGED TO LOCATE
CENTERS OF ENERGY OF SPACED PULSES
Filed Nov. 4, 1963 12 Sheets-Sheet 1

INVENTOR.
LAWRENCE W. MILLS
BY
ATTORNEY

INVENTOR.
LAWRENCE W. MILLS

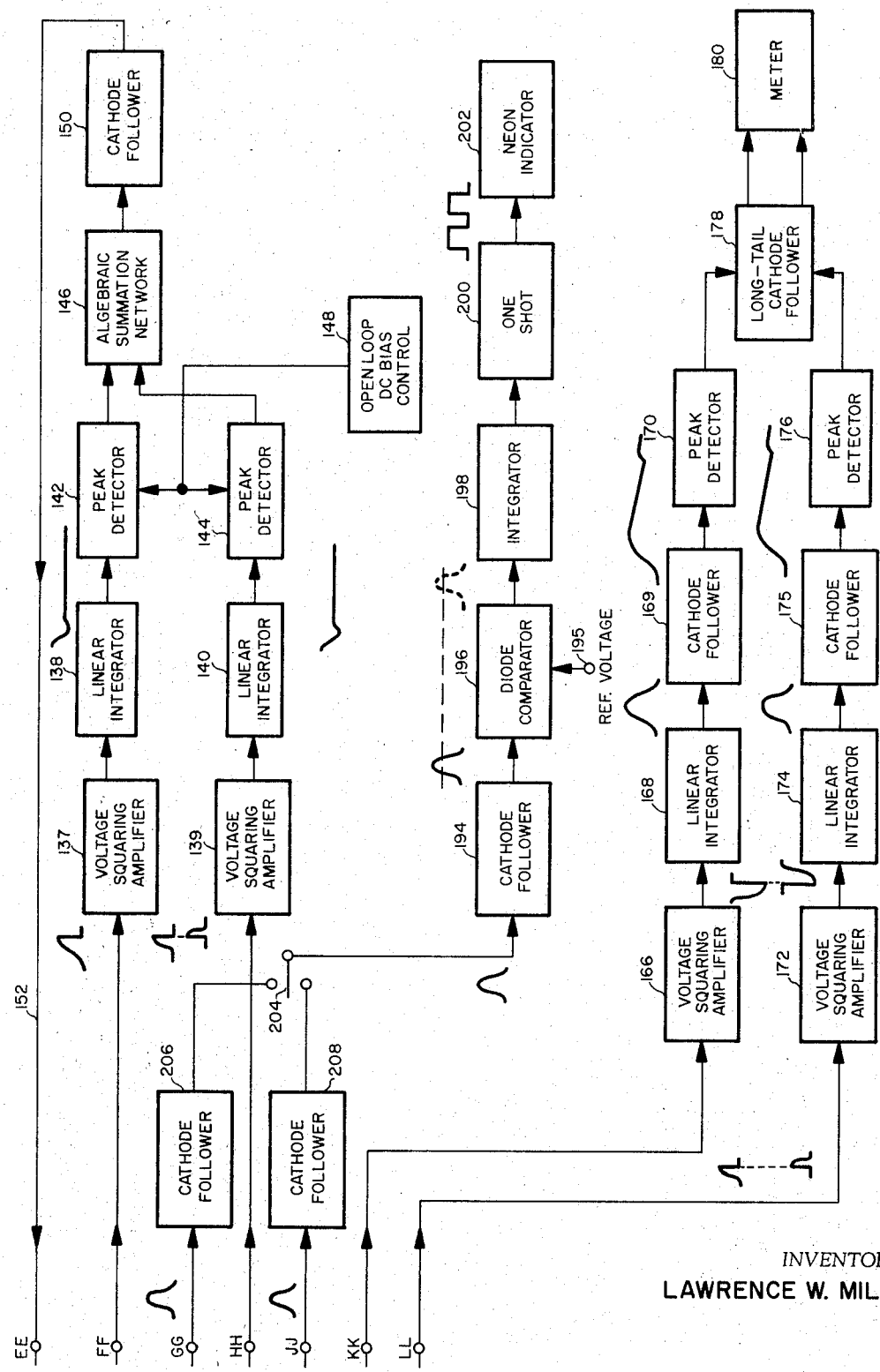

Feb. 20, 1968 — L. W. MILLS — 3,370,228
TIME MEASUREMENT DEVICE ARRANGED TO LOCATE CENTERS OF ENERGY OF SPACED PULSES
Filed Nov. 4, 1963 — 12 Sheets-Sheet 6

INVENTOR.
LAWRENCE W. MILLS
BY Michael A. Silver
ATTORNEY

INVENTOR.
LAWRENCE W. MILLS
BY
*Michael A. Silea jr.*
ATTORNEY

INVENTOR.
LAWRENCE W. MILLS
ATTORNEY

INVENTOR.
LAWRENCE W. MILLS
ATTORNEY

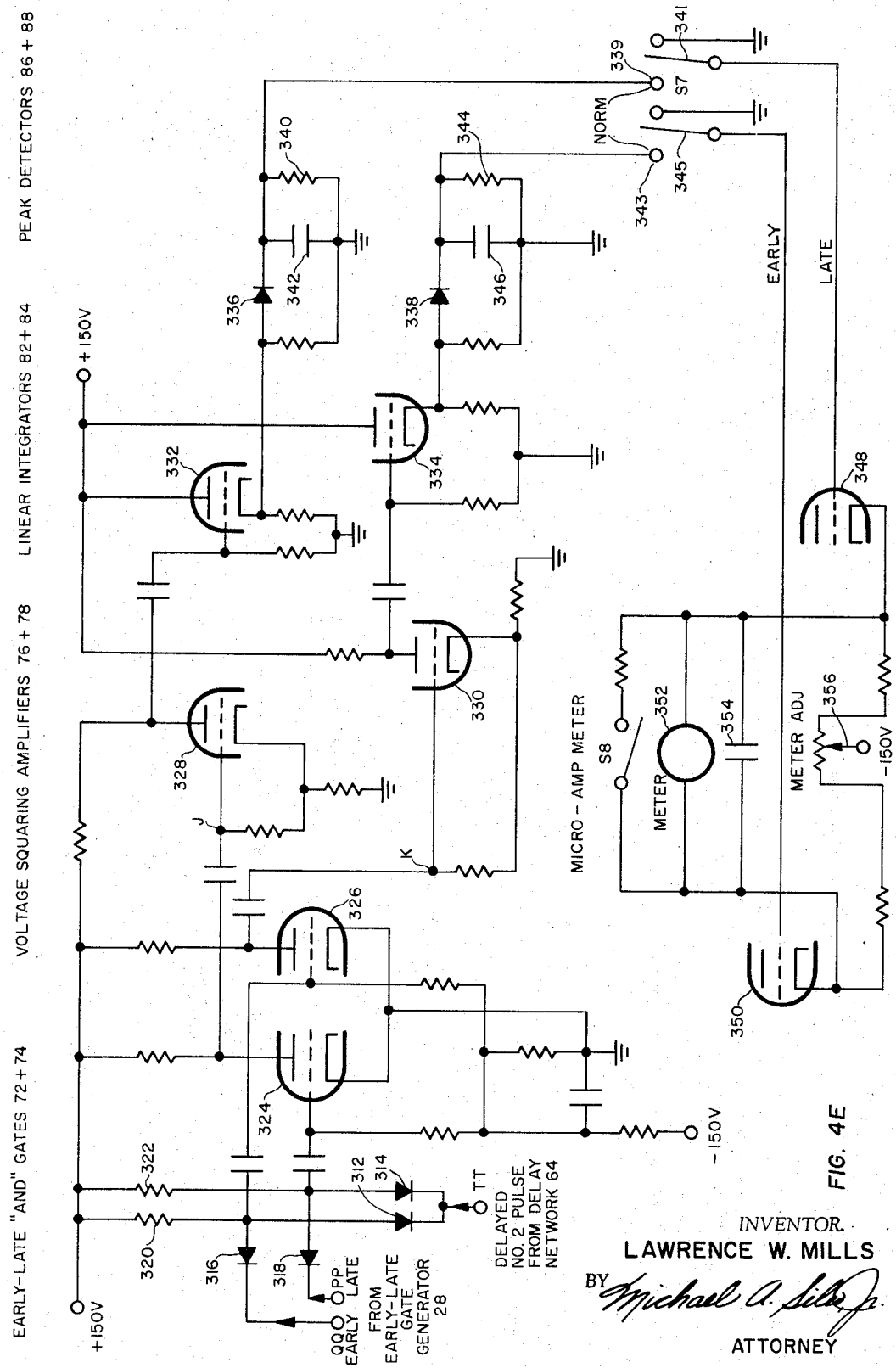

INVENTOR.
LAWRENCE W. MILLS
BY Michael A. Silka Jr.
ATTORNEY

Feb. 20, 1968   L. W. MILLS   3,370,228
TIME MEASUREMENT DEVICE ARRANGED TO LOCATE
CENTERS OF ENERGY OF SPACED PULSES
Filed Nov. 4, 1963

INVENTOR.
LAWRENCE W. MILLS
BY
*Michael A. Silko, Jr.*
ATTORNEY

United States Patent Office 3,370,228
Patented Feb. 20, 1968

3,370,228
TIME MEASUREMENT DEVICE ARRANGED TO LOCATE CENTERS OF ENERGY OF SPACED PULSES
Lawrence W. Mills, Orange County, Fla., assignor to Martin-Marietta Corporation, Middle River, Md., a corporation of Maryland
Filed Nov. 4, 1963, Ser. No. 321,153
11 Claims. (Cl. 324—68)

This invention relates to time measurement systems and more particularly to a system for measuring the elapsed time between the centers of energy of closely spaced pulses.

Many newly developed electronic systems utilizing pulse techniques describe parameters which are a direct function of time. In systems of this type time accuracy becomes quite important. For example, radar range accuracy can never exceed the accuracy of the time base; correlation accuracy of various sources of data are directly dependent on time accuracy; guidance systems employing pulse techniques have time accuracy as a limiting function; and any application describing a dynamic property is time accuracy dependent.

In many of the pulse applications described above, it is not acceptable to merely measure time durations from the leading or trailing edges of the pulses. Rather, it has been discovered that it is quite desirable to measure time from the center of energy of the pulse. The use of the center of energy of a pulse for determining the time measurements eliminates errors commonly associated with measuring systems using the leading or trailing edge of the pulse as a reference.

In addition to the foregoing applications of the present invention, a system which determines the center of energy of a single input pulse has utility in electronic circuits not dependent upon relative functions of time. For example, the technique for locating the center of energy of a pulse of energy may be used for triggering electronic circuits, such as synchronizing circuits, oscillators, multivibrators, and gate generators, or for commencing a cycle of operation of other electronic circuits, such as computers, timing circuits, welding circuits and reaction time simulator circuits. Further, the present novel system for locating the center of energy of an energy pulse may be utilized to determine the symmetry of the first half of an energy pulse with respect to the second half of that same energy pulse.

It will be apparent to those skilled in the art that other uses of the unique center of energy locating technique and time interval measuring system of the present invention are possible without departing from the spirit and scope thereof.

Accordingly, it is an object of the present invention to provide an improved system which accurately determines the center of energy of an input pulse.

It is a further object of the present invention to provide a system which is capable of measuring the elapsed time between the centers of energy of two pulses which may be from common or from separate pulse generating sources.

It is a further object of the present invention to provide a system which is capable of locating the center of energy of each of two input pulses and is capable of measuring the time spacing between these two centers over a wide range.

It is a further object of the present invention to provide a system which is capable of accurately and rapidly determining the elapsed time between the centers of energy of two pulses, such as the transmitted and received pulses of a radar system.

In accordance with one embodiment of the invention, the center of energy of a pulse is determined by dividing the pulse at a time when the energy already passed equals the energy yet to pass. If the proper time is chosen, the two halves of the pulse will contain equal amounts of energy and the time will be indicative of the center of energy of the pulse. In order to do this, a bistable gate generator is provided to gate a first portion of the input pulse through a first energy indicating circuit and then to gate the remaining portion of the input pulse through a second energy indicating circuit. If the gate generator is triggered at exactly the center of energy of the incoming pulse, the outputs of the first and second energy indicating circuits will be equal. The outputs of these two energy indicating circuits are then compared and a DC feedback signal is developed which is indicative of any differences in the energies of the two portions of the input pulse. This DC feedback signal is used to control the time of triggering of the gate generator in such a way that the outputs of the two energy indicating circuits are always equal. By this means the time of triggering of the gate generator is indicative of the location of the center of energy of the pulse.

In order to measure the time interval between the centers of energy of a first and a second pulse, the circuitry just described is utilized to locate the center of energy of the first pulse only. The gate generator is then used to divide and gate the second pulse into two additional energy-indicating circuits, the outputs of which are connected to a differential meter. When the outputs of these two energy-indicating circuits are equal, the meter indicates a null or zero reading. Initially, the meter will not read a null because the gate generator is being triggered at the center of energy of the first pulse and not at the center of energy of the second pulse. The first pulse is then delayed by increasing increments of time until the center of energy of the first pulse coincides in time with the center of energy of the second pulse. This latter condition is indicated by a null reading on the meter. The total delay is therefore uniquely indicative of the time-spacing of the first and second pulses. By calibrating the system with accurately spaced pulses, a conversion factor can be obtained which easily translates the amount of delay into a time interval for the spacing of the unknown pulses.

These and other objects, advantages, and features of the subject invention will be better understood with reference to the following more detailed description and appended claims together with the drawings in which:

FIGURE 1 depicts a block diagram of a preferred embodiment of the present invention;

FIGURE 2 sets forth exemplary waveforms present at specific terminals of the block diagram of FIGURES 1 and 4A–4G;

FIGURES 3A, 3B and 3C depict a more detailed block diagram of a preferred embodiment of the present invention with the conductors AA to DD of FIG. 3A being connected to conductors AA to DD of FIG. 3B, and the conductors EE to LL of FIG. 3B being connected to conductors EE to LL of FIG. 3C; and FIGURES 4A through 4F set forth exemplary detailed circuitry of the preferred embodiment of FIG. 1.

*Detailed description—FIGS. 1–2*

Figure 1:
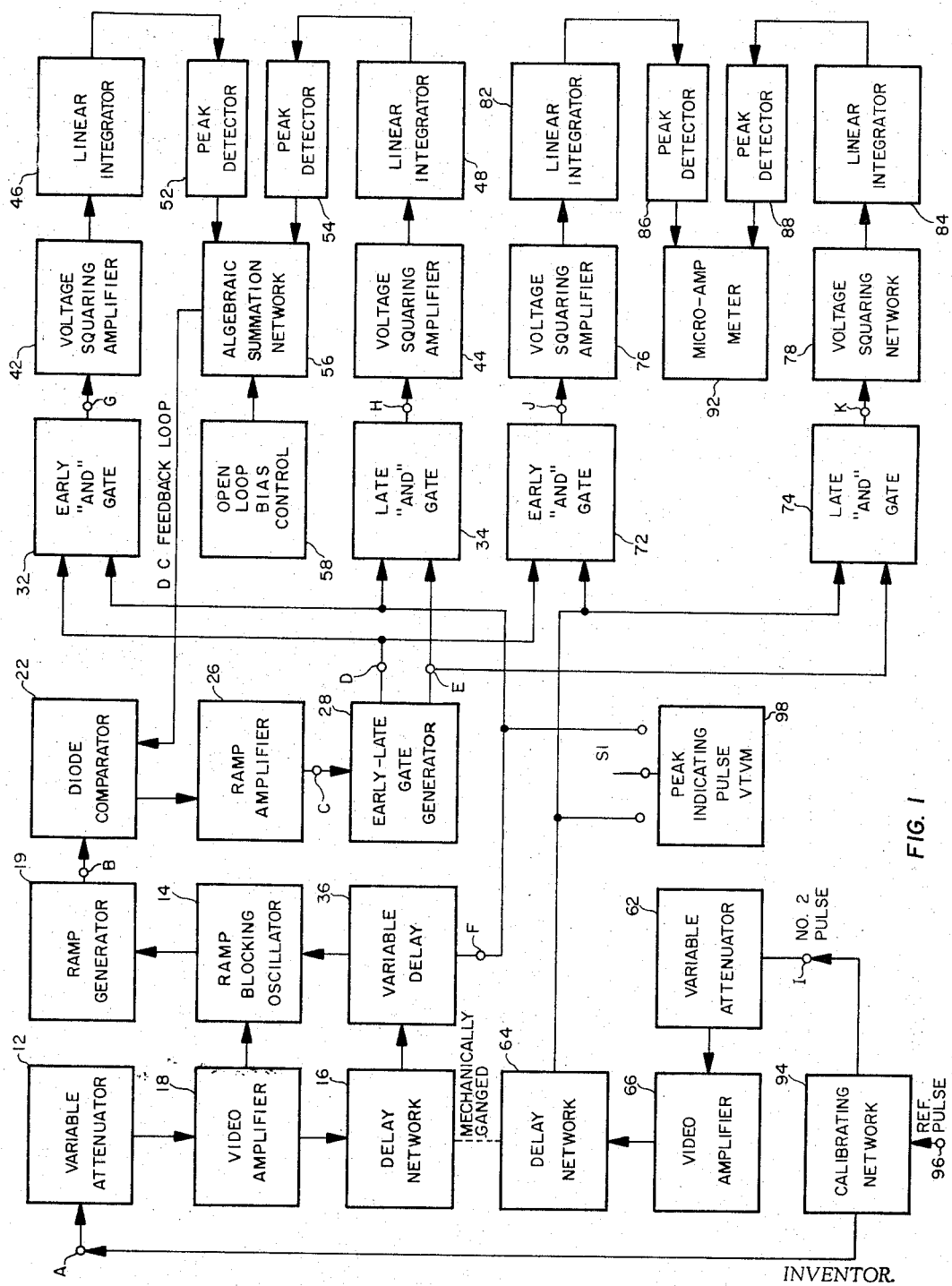
Figure 2:
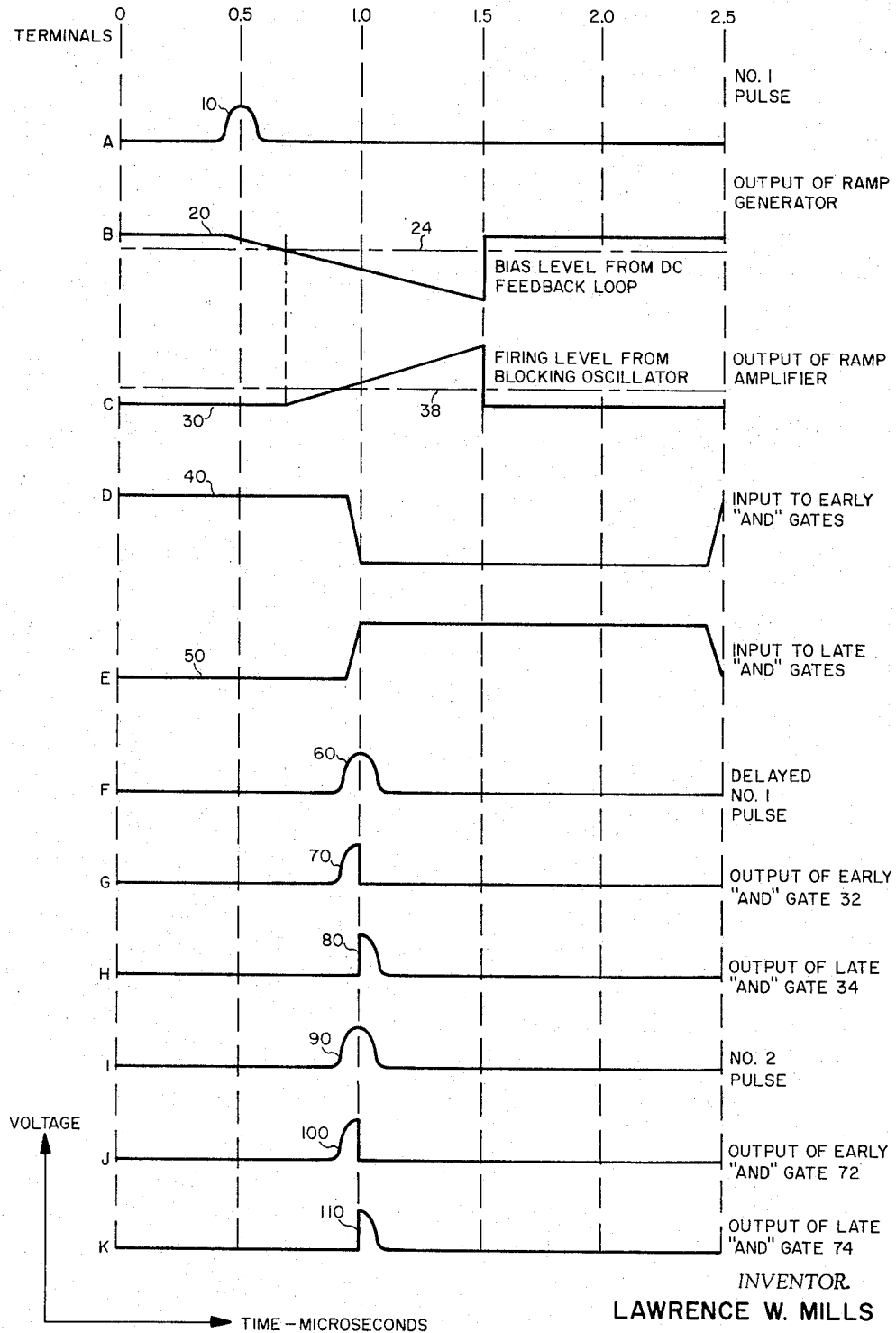

Referring now in detail to the block diagram of FIG. 1 in light of the waveforms of FIG. 2, the No. 1 input pulse shown at 10 in FIG. 2 is conventionally coupled at A in FIG. 1 to a frequency compensated Variable Attenuator 12 wherein the amplitude of the input pulse 10 is controlled so as to achieve desirable gain characteristics for the system. The output of Variable Attenuator 12 is simultaneously coupled to both a Ramp Blocking Oscillator 14 and a Delay Network 16 via a Video Amplifier 18.

The output signal from the Blocking Oscillator 14 is coupled to trigger the Ramp Generator 19, which develops at point B a ramp signal 20, a portion of which signal is a negatively swinging sawtooth as shown on line B in FIG. 2. Ramp signal 20 is coupled to Diode Comparator 22 wherein a DC bias level 24 as shown in FIG. 2 controls the voltage level at which an output signal will be coupled to the Ramp Amplifier 26. That is to say, by appropriately coupling a DC bias to Diode Comparator 22, only that portion of ramp signal 20 which exceeds the voltage level of DC bias 24 will be coupled to the Ramp Amplifier 26. The DC bias level 24 is dynamically controlled and developed by a DC feedback loop which will be subsequently described in detail. The output of Ramp Amplifier 26 is then coupled to the Early-Late Gate Generator 28, which output is a positive swinging sawtooth signal 30. When signal 30 equals the voltage level 38 (see FIG. 2) the Early-Late Gate Generator 28 fires and complementary outputs 40 and 50 are generated, one (40) for enabling the Early AND Gate 32 and another (50) for enabling the Late AND Gate 34. Signals 40 and 50 are respectively coupled to one of the input terminals of Gates 32 and 34.

Referring now to the Delay Network 16, its output is coupled to a Variable Delay 36. The combined delay of Delay Network 16 and Variable Delay 36 delays the No. 1 pulse 10 (see delayed pulse 60) a predetermined amount. The delayed pulse 60 is then simultaneously coupled to the other input terminals of the Early and Late AND Gates 32 and 34.

It should be noted at this point that when Early Gate 32 is enabled a first portion of the delayed pulse 60 will appear at terminal G, as shown by waveform 70, and when Late Gate 34 is enabled the remaining portion of delayed pulse 60 will appear at terminal H, as shown by waveform 80. This is so because of the complementary triggering characteristics of Early and Late Gates 32 and 34 by the square wave signals 40 and 50. Thus, the delayed pulse 60 is divided into two portions, the first portion (waveform 70) appears at terminal G, and the second portion (waveform 80) appears at terminal H.

In order to balance the energy present in waveforms 70 and 80, these signals are respectively coupled to voltage Squaring Amplifiers 42 and 44 wherein they are voltage squared ($V^2$), and then the squared voltage signals are respectively integrated by Linear Integrators 46 and 48. The outputs of Linear Integrators 46 and 48 are respectively coupled to Peak Detectors 52 and 54, the outputs of which are coupled to Algebraic Summation Network 56 wherein a DC output indicative of the relative energy in the waveforms 70 and 80 is developed. The output of Algebraic Summation Network 56 is then utilized as a DC feedback voltage to provide the bias level 24 for the Diode Comparator 22.

It will be apparent, therefore, that variations in the DC feedback voltage will proportionally vary the amount of the waveform 20 which will be coupled to the Ramp Amplifier 26 and consequently coupled to the Early-Late Gate Generator 28. Thus, the triggering time of Gate Generator 28 will be proportionally varied and consequently the rise and fall times of complementary signals 40 and 50 will proportionally vary due to change in the amplitude of the waveform 30. Accordingly, the voltage level 24 of the DC feedback voltage will be dynamically varied as a result of variations in the triggering time of the Gate Generator 28, with positive changes in feedback voltage causing the gate generator to fire earlier, and negative changes causing it to fire later. When the energy present in waveform 70 is equal to the energy present in waveform 80, the Gate Generator 28 is triggered at a time which corresponds to exactly the center of energy of the delayed pulse 60, as shown at time 1.0 in FIG. 2.

An Open Loop Bias Control 58 is also connected to the Algebraic Summation Network 56 for balancing the No. 1 pulse channel so that any intercircuit errors which may exist in either the upper branch 32-42-46 or the lower branch 34-44-48 of this channel will not undesirably distort or alter the energy in pulses 70 and 80 as they are respectively processed through the upper and lower branches.

Referring now to the lower left hand portion of FIG. 1, the No. 2 input pulse 90 is conventionally coupled to a frequency compensated Variable Attenuator 62 wherein the amplitude of the input pulse 90 is controlled so as to achieve desirable gain characteristics for the system. The output of Variable Attenuator 62 is then coupled to a Delay Network 64 via a Video Amplifier 66.

The output signal from the Delay Network 64 is simultaneously coupled to the input terminal of Early AND Gate 72 and Late AND Gate 74. It should be noted at this point that when the Early-Late Gate Generator 28 fires, the complementary signals 40 and 50 are also respectively coupled to Early AND Gate 72 and Late AND Gate 74.

The operation of Gates 72 and 74 are similar to the operation of Gates 32 and 34, as mentioned above. Briefly restating, when Early Gate 72 is enabled, a first portion of pulse 90 will appear at terminal J, as shown by waveform 100, and when Late Gate 74 is enabled, the remaining portion of pulse 90 will appear at terminal K, as shown by waveform 110. Thus, the pulse 90 is divided into two portions 100 and 110. The energy present in waveforms 100 and 110 is developed by coupling them respectively to Voltage Squaring Amplifiers 76 and 78 wherein these signals are voltage squared ($V^2$), and then respectively integrated by Linear Integrators 82 and 84. These integrated signals are then respectively coupled to Peak Detectors 86 and 88, the outputs of which are coupled to a differential meter, such as Micro-Amp Meter 92 wherein a zero reading is produced when the outputs of Peak Detectors 86 and 88 are equal.

It will be apparent, therefore, that when the Meter 92 reads zero, the center of energy of the delayed No. 1 pulse 60 must be coincidental with the center of energy of the No. 2 pulse 90. This is so because the servo loop, which includes the Summation Network 56, the DC feedback loop, and the Diode Comparator 22, ensures that the Gate Generator 28 is always triggered at exactly the center of energy of the delayed pulse 60, and because the delay of pulse 10 can be changed by varying the variable delay 36 until not only at the center of energy of pulse 60 but also the triggering of Gate Generator 28 occurs at the center of energy of pulse 90. Thus, by varying the delay of pulse 10, the Gate Generator 28 is caused to trigger when the centers of energy of the delayed No. 1 pulse 10 (pulse 60) and the No. 2 pulse 90 are coinciding.

It is to be noted at this point that the time measuring system of the present invention must be initially calibrated. For example, the system may be calibrated by inserting two pulses at terminals A and I with the pulse applied to terminal I being delayed a known finite period from the pulse applied at terminal A. A delay reading on the calibrated delay 36 is then recorded. The calibrating pulses are then discretely delayed a greater finite period with respect to each other and corresponding delay readings are recorded. This procedure is repeated throughout the entire delay measurement range of the system. It will be apparent that appropriate delay readings v. time charts may be made from the above recordings and utilized with the system as a calibration curve for translating actual delay readings when two unknown pulses are applied to the system, into actual time interval readings between the two unknown pulses.

It is advantageous to provide a means for periodically checking the accuracy of the system. This means is graphically represented by block 94 at the lower left hand portion of FIG. 1. In order to check the calibration of the foregoing system, two accurately spaced pulses must be coupled into the system at terminals A and I. This calibration procedure is necessary in order to determine the required delay line setting for producing coincidence of the two pulses so that the delay line settings established when unknown pulses are applied to the system can be accurately translated into extremely short time intervals.

The reference pulse (not shown) is conventionally applied to terminal 96 of Calibrating Network 94 wherein two calibration pulses are generated which are accurately time spaced by a predetermined time interval. The first calibration pulse is coupled to terminal A, i.e., the No. 1 pulse input terminal, whereas the other calibration pulse is coupled to terminal I, i.e. the No. 2 pulse input terminal. The Variable Delay 36 is then adjusted until the Micro-Amp Meter 92 reads zero. The total delay reading of the system should be equal to the predetermined delay between the calibration pulses developed by the Calibration Network 94. Any errors in the total delay reading can be accounted for by appropriate and well known adjustments to the Delay Networks 16 and 64 and the Variable Delay 36, for example. A detailed description of a preferred embodiment of the Calibrating Network is set forth hereinafter.

A Peak Indicating Pulse VTVM 98 is provided to permit presetting of the voltage levels of the input pulses 10 and 90 within a desired accuracy, such as 0.1 db, without regard to pulse shape or width. A detailed description of the Peak Indicating Pulse VTVM 98 is set forth hereinafter.

When the pulse 10 initially propagates through the system to the Early and Late AND Gates 32 and 34 it experiences little or no delay. Also, the servo loop which includes the Voltage Squaring Amplifiers 42 and 44, Linear Integrators 46 and 48, Peak Detectors 52 and 54, Algebraic Summation Network 56 and Diode Comparator 22, accurately controls the triggering of the Gate Generator 28 so that it is always triggered at the center of energy of pulse 60 (pulse 10 delayed), whether this pulse receives minimum or maximum delay with respect to the arrival time of pulse 10 at terminal A. Accordingly, by virtue of the action of the servo loop, the energy in the pulses 70 and 80, which are respectively passed through the Early and Late AND Gates 32 and 34, are equal. However, since the Gate Generator 28 is continuously controlled so as to be triggered at the center of energy of pulse 60, the energy in the pulses 100 and 110, which are respectively passed through the Early and Late AND Gates 72 and 74, will be unequal. Because of this disparity in the energy of output pulses 100 and 110, the Micro-Amp Meter 92 will have a reading other than zero or null.

It will be apparent, therefore, that by delaying pulse 10 (pulse 60) with respect to pulse 90, its center of energy can be made to coincide with the center of energy of pulse 90. The coincidence of the centers of energy of pulses 60 and 90 is achieved by course delay adjustments of the mechanically ganged Delay Networks 16 and 64 and by fine delay adjustments of the Variable Delay 36. Thus, when the center of energy of pulse 60 coincides with the center of energy of pulse 90, the Gate Generator 28 will be triggered at exactly the centers of energy of both pulses 60 and 90, and the Micro-Amp Meter 92 will indicate a zero or null reading.

The amount of delay necessary to cause the center of energy of pulse 10 to coincide with the center of energy of pulse 90 accurately indicates the time interval between the two pulses. The settings of the delay lines of the system can be accurately translated into time duration readings.

Figure 3A:
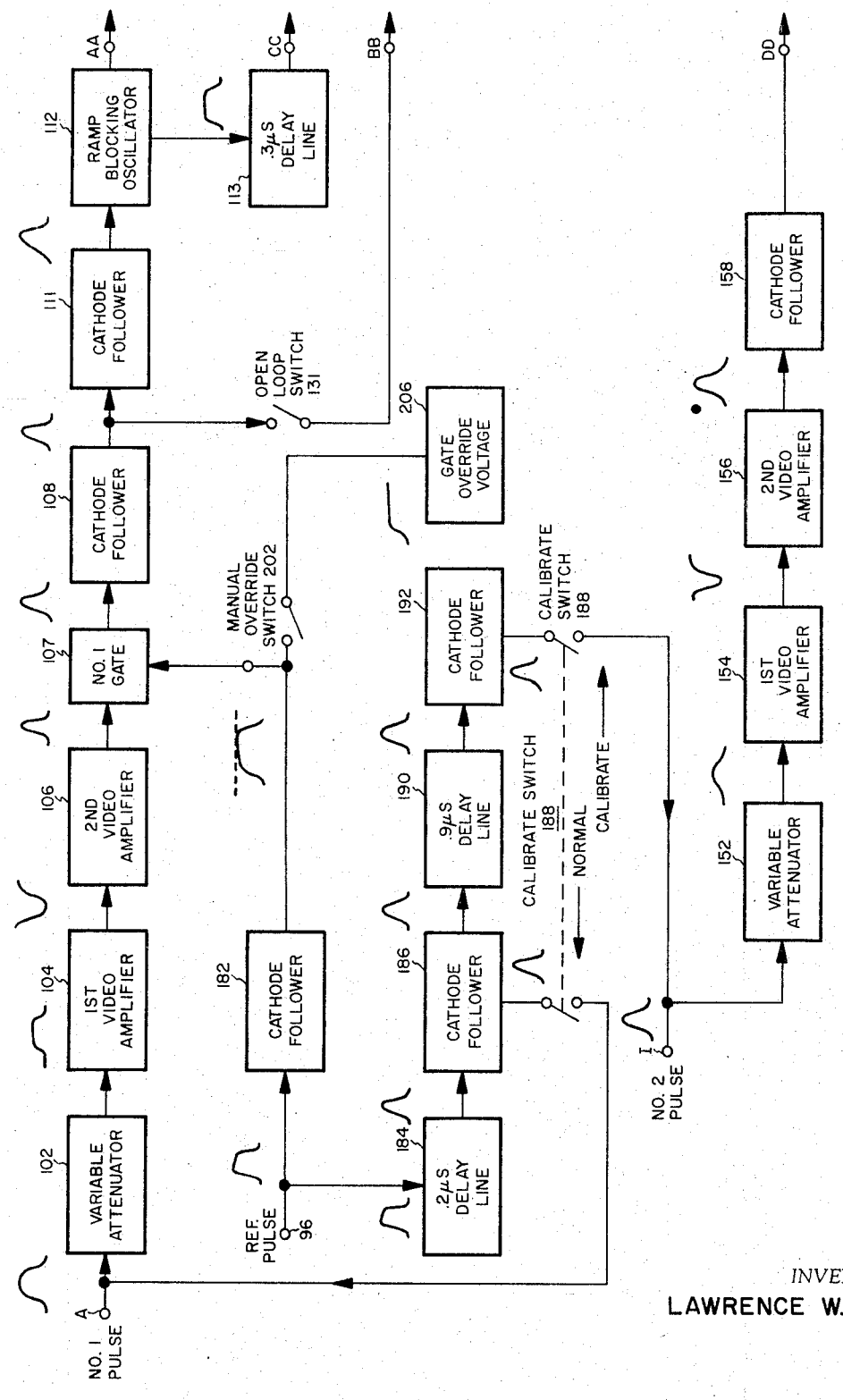
Figure 3B:
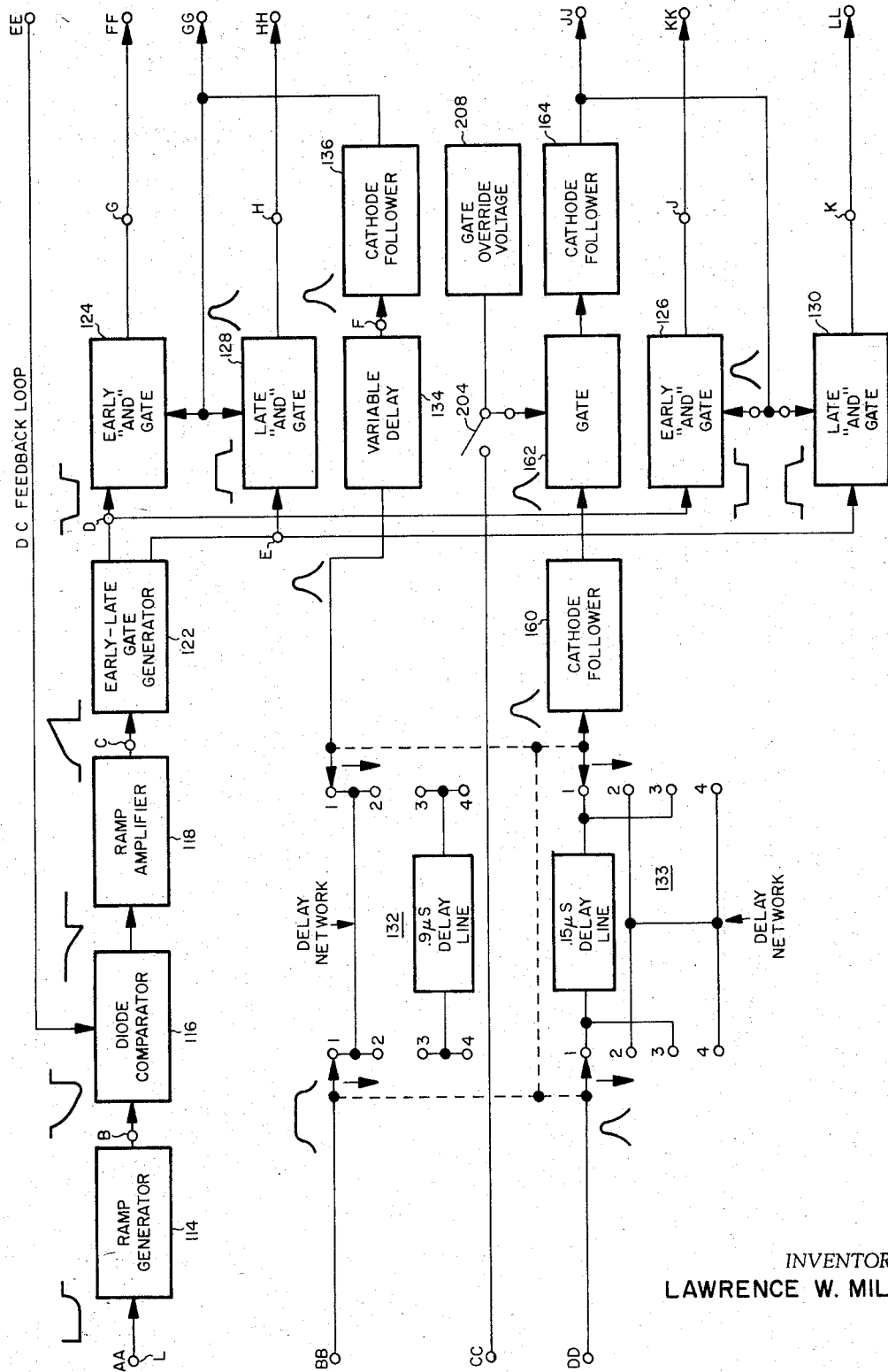

*Detailed description—FIGS. 3A–3C*

To simplify the complexity of this detailed block diagram FIGS. 3A, 3B and 3C have been placed on three sheets of drawing and should be viewed together. The circuit connections between each figure are shown as AA to DD couplings FIGS. 3A and 3B and EE to LL for coupling FIGS. 3B and 3C.

Although several waveforms which appear at certain points within the block diagrams of FIGS. 3A–3C are depicted, reference will also be made to the waveforms of FIG. 2 which are also included for the purpose of relating this detailed block diagram of the present invention with the more simplified block diagram of FIG. 1.

Referring now to FIGS. 3A–3C wherein a more detailed block diagram of the time measurement system of the present invention is set forth, the No. 1 input pulse 10 is introduced into the system at terminal A and then coupled to a variable attenuator 102, which attenuator is frequency compensated so as to provide a means for controlling the gain characteristics of the system. The output of variable attenuator 102 is then coupled to a first video amplifier 104, whose output is coupled to a second video amplifier 106. The second video amplifier 104 is coupled to the cathode follower 108 through the No. 1 Gate 107. The first video amplifier 104 incorporates a conventional gain control, and both video amplifiers 104 and 106 are of conventional well known circuitry.

The output of cathode follower 108 is coupled to the ramp blocking oscillator 112 via a cathode follower 111; wherein a millimicrosecond pulse is generated for triggering the passive RC ramp generator 114. The output of the ramp generator 114 is shown as waveform 20 of FIG. 2. This ramp signal is then coupled to one input terminal of the diode comparator 116 whereas a DC bias voltage is coupled to the other input terminal of the comparator 116 via a feed back loop arrangement which will be described later. Diode comparator 116 develops an output voltage which is equal only to that portion of the output of the ramp generator 114 which exceeds the DC bias voltage feedback via the DC feedback loop to the other input of the diode comparator 116. The output of the diode comparator 116 is then coupled to ramp amplifier 118 the output of which triggers the early-late gate generator 122.

It should be noted that the waveform 30 of FIG. 2 will appear at terminal C which is the output terminal of ramp amplifier 118. One output of the gate generator 122 (waveform 40—FIG. 2) is coupled to the early AND gates 124 and 126 whereas the other output of gate generator 122 (waveform 50—FIG. 2) is coupled to the late AND gates 128 and 130. Thus, the first output of gate generator 122 enables the early gates 124 and 126 whereas the second output enables the late gates 128 and 130. It should be further noted at this point that the outputs of gate generator 122 are complementary so that when the early AND gates 124 and 126 are enabled the late AND gates 128 and 130 are inhibited. Thus, when the gate generator 122 is triggered by the output of the ramp amplifiers 118 the early AND gates 124 and 126 are inhibited and the late AND gates 128 and 130 are enabled.

The output of cathode follower 108 is also coupled to the delay network 132 via an open loop switch 131 wherein the pulse from cathode follower 108 can be predeterminedly delayed by mechanically stepping the delay network 132 to any one of its four positions. Delay network 132 provides course adjustments for delaying the pulse from cathode follower 108. However, a fine delay adjustment is provided by variable delay 134, which is connected to the output of delay network 132.

It should be noted that the waveform 60 will appear at terminal F which is the output of variable delay 134. Further, although a stepping delay network for course adjustments and a variable delay for fine adjustments for the delay of input pulse 10 are shown herein, any well known type of delay techniques can be incorporated without departing from the spirit and scope of the present invention.

The delayed pulse 60 is then coupled respectively to the early AND gates 124 and 128 via a cathode follower 136. Thus, depending upon whether the early AND gates 124 and 128 are enabled or inhibited the delay pulse 60 or any portion thereof depending upon the time relationship between the complementary outputs of gate generator 122 and the delayed pulse 60 will be passed through one or the other of such gates.

In order to compare the energies of pulses 70 and 80, pulse 70 is coupled to Linear Integrator 138 through Voltage Squaring Amplifier 137, wherein an output voltage is produced which is proportional to the energy in pulse 70; similarly, pulse 80 is coupled to Linear Integrator 140 through voltage squaring amplifier 139, wherein an output voltage is produced which is proportional to the energy in pulse 80. The output voltages of Linear Integrators 138 and 140 are coupled through Peak Detectors 142 and 144 to Algebraic Summation Network 146.

An Open Loop Bias Control 148 is provided for applying a DC voltage to Peak Detectors 142 and 144, which voltage balances out substantially all component errors in the servo loop when the delayed pulse 60 is not coupled to the Early and Late AND Gates 124 and 128. Thus, when the servo loop is closed and time measurements are being made, little or no decrease in accuracy occurs as a result of omissive or commissive pulse errors, such as that caused by incoming pulse rate changes. It will be apparent that the output of the algebraic Summation Network 146 will be a DC voltage indicative of the energy difference between pulses 70 and 80. This DC voltage is then coupled through the DC Cathode Follower 150 to one of the input terminals of Diode Comparator 116 via DC Feedback Loop 152. Accordingly, the DC feedback loop, i.e. the servo loop, controls the triggering of Gate Generator 122. Thus, as the DC feedback voltage becomes more positive more of the ramp voltage waveform 30 will pass through diode comparator 116 and consequently trigger the gate generator 122 at a later time. Since the magnitude of the DC feedback voltage is dependent upon the respective energies of the pulses 70 and 80 which are respectively passed through early and late AND gates 124 and 128, the overall system can be adjusted so that the Gate Generator 122 is triggered at exactly the center of energy of the delayed pulse 60.

Referring now to the lower left hand portion of FIG. 3A, the input pulse 90 is coupled to the delay network 133 through variable attenuator 152, first and second video amplifiers 154 and 156, respectively, and the cathode follower 158. The output of the delay network 133 is then simultaneously coupled to the early and late AND gates 126 and 130 via cathode follower 160, gate 162 and cathode follower 164.

It should be noted at this point that the complementary outputs 40 and 50 developed by the gate generator 122 are respectively coupled to the early and late AND gates 126 and 130 so as to enable and inhibit these gates in a manner similar to that above described with respect to early and late AND gates 124 and 128.

The output pulses 100 and 110, respectively appear at terminals J and K which are the outputs of early and late AND gates 126 and 130, respectively. Output pulses 100 and 110 are then respectively voltage squared by voltage squaring amplifiers 166 and 172, integrated in linear integrators 168 and 174 and coupled to Peak Detectors 170 and 176 via cathode followers 169 and 175. The outputs of peak detectors 170 and 176 are respectively coupled to the input terminals of the differential long-tail cathode follower 178 wherein an output indicative of the relative energies contained in the output pulses 100 and 110 is produced and utilized to energize the meter 180 whereby a "0" or null reading is achieved when the energies in pulse 100 and 110 are equal. Accordingly, when meter 180 indicates a zero or null reading, the gate generator 122 will be firing at exactly the center of energy of pulses 90.

It should be noted here that the servo loop, which includes inter alia the algebraic summation network 146 and the diode comparator 116 dynamically controls the gate generator 122 so that it is triggered at the center of energy of the pulse 10, notwithstanding the amount of delay inserted by the delay network 132 and variable delay 134. In addition, since the delay network 132 and variable delay 134 are adjusted until the meter 180 reads "0," the gate generator 122 is caused to fire at the center of energy of the pulse 90 and consequently the center of energy of delayed pulse 60 which represents input pulse 10 delayed. Accordingly, the amount of delay of pulse 10 necessary to align its center of energy with the center of energy of pulse 90 uniquely indicates the time interval between pulse 10 and pulse 90. Thus, by appropriate calibration of the present system the settings of the delay network 132 and variable delay 134 can be accurately translated into time duration readings.

In order to provide a highly accurate time measuring system several calibrating and balancing circuits are necessary. These additional circuits include a basic calibrating unit, a circuit for changing the range of the system, a circuit for limiting the amplitudes of the incoming pulses 10 and 90, and a circuit for switching the system to various modes of operation.

In order to calibrate the system it is necessary to introduce accurately spaced reference pulses into the system to determine the delay line settings required to produce coincidence of these pulses so that such delay line settings can be accurately translated into time interval readings.

The reference pulse is applied at input terminal 96 and may be generated by any well known pulse generating circuit having highly accurate and reliable waveform characteristics. The referenced pulses are coupled to cathode follower 182, the output of which provides gating pulses for the gate 107. In order to assure that the gating pulse from cathode follower 182 will enable gate 107 before the reference pulse is coupled to the input terminal A the reference pulse is coupled to a small delay line 184, such as a two-tenths (.2) microsecond delay, and coupled to the input terminal A via cathode follower 186 and calibrate switch 188. The output of cathode follower 186 is also coupled to delay line 190, such as a nine-tenths (.9) microsecond delay, the output of which is coupled to the input terminal I via cathode follower 192 and calibrate switch 188. Accordingly, the outputs of cathode followers 186 and 192, respectively represent the No. 1 and No. 2 calibrating pulses which respectively correspond to the input pulses 10 and 90.

It should be noted that delay line 190 is a secondary standard and must have highly stable characteristics in order to insure highly accurate calibration of the system.

Range adjustments are appropriately provided by connecting the Delay Network 132 into the path of input pulse 10. This is accomplished by stepping the Delay Network 132 into one of its discrete delay positions thereby providing several predetermined ranges of operation.

It has been determined that the triggering characteristics of the Early-Late Gate Generator 122 is significantly influenced by the amplitude of the incoming pulses 10 and 90. In order to control the amplitude of pulses 10 and 90, a peak indicating circuit is provided which includes cathode follower 194, diode comparator 196, integrator 198, "one-shot" 200 and neon indicator 202. A reference voltage is coupled to the diode comparator 196 so that the voltage of the incoming pulses 10 and 90 may be independently compared therewith. A switch 204 is also provided for selectively coupling either the pulse 10 or the pulse 90 to the cathode follower 194. The pulse 10, i.e., delayed pulse 60, is coupled from cathode follower 136 to cathode follower 194 through cathode follower 206. The amplitude of pulse 10 is controlled by appropriate adjustment of the variable attenuator 102 so that neon indicator 202 is just barely ignited. This insures that the amplitude of pulse 10 is controlled to a predetermined level with respect to the reference voltage coupled to diode comparator 196.

In order to establish a reference point around which the servo loop can vary, an open loop DC bias control is provided. This adjustment is done before a time duration measurement is made. This is accomplished by providing an open loop switch 131 which when opened prevents the delayed pulse 60 from propagating through the delay network 132 of the system. When this switch is opened, the Open Loop DC bias control is varied until the DC servo loop causes the leading edges of the complementary outputs 40 and 50 to coincide with the center of energy of the pulse 90. The meter 180 will indicate such coincidence. Accordingly, this open loop DC bias control establishes a reference voltage for the servo loop so that it can operate with a smaller gate requirement than would be needed if a remote time reference were utilized. Thus, when open loop switch 131 is closed and the delay network adjusted until a zero or null reading on meter 180 is obtained, the reading of the delay network uniquely indicates a highly accurate time separation between incoming pulses 10 and 90.

The Gate Override switches 202 and 204 and Gate override voltages 206 and 208 are provided so that the system can be accurately operated when the incoming pulses are supplied by a single source. This is necessary so that alternate pulses from the single source can be gated appropriately through the system. This permits the system to distinguish between the first pulse to arrive and the second pulse to arrive. The gates 107 and 162 are provided to accomplish this gating feature. However, it is often necessary to override gates 107 and 162. Thus, by closing switch 202 gate 107 is enabled regardless of the occurrence of gating pulses and similarly by closing switch 204 gate 162 is enabled regardless of the occurrence of gating pulses.

*Detailed description—FIGS. 4A–4G*

Thus far in the description of the Time Measuring System of the present invention very little circuit details have been set forth. FIGS. 4A to 4G in combination show detailed circuitry of one preferred embodiment. It is to be understood, of course, that other known circuits can be substituted therein without departing from the spirit and scope of the present invention.

For purposes of simplicity of understanding, the blocks of FIG. 1 are exemplified in capital letters in FIGS. 4A–4G in close proximity to their corresponding detailed circuits. In addition, the terminals A to K of FIG. 1 are also included in FIGS. 4A–4G whereon the waveforms of FIG. 2 respectively appear.

The No. 1 pulse 10 is coupled to the grid of a cathode follower 210 which, together with attenuator switch S2 and RC network 212, make up the variable attenuator 12. By varying switch S2, the amplitude and shape of pulse 10 can be controlled within desired limits. Variable Attenuator 12 is preferably frequency compensated.

The output of Variable Attenuator 12 is coupled to the grid of a first video amplifier 214 which has a gain control that overlaps the gain control of the Variable Attenuator 12. The output of the first video amplifier 214 is taken from the plate thereof and capacitively coupled to the grid of a second video amplifier 216, the output of which is taken from the plate thereof and capacitively coupled to the grid of a cathode follower 218. The cathode followers 210 and 218 and the video amplifiers 214 and 216 and their associated circuit components are of conventional design and have adequate gain-bandwidth characteristics so as to accommodate the No. 1 pulse 10. A diode gate 220 is connected to the cathode of cathode follower 218 for controlling the passage of pulses to subsequent circuitry. The function of diode gate 220 is conventional.

The output of diode gate 220 is coupled to the grid of a cathode follower 222, the output of which is taken from the cathode thereof and capacitively coupled both to the grid of cathode follower 224 and to the Delay Network 16. The diode gate 220 and cathode followers 222 and 224 are also of conventional design and along with cathode follower 218 and video amplifiers 214 and 216, make up the Pulse Video Amplifier 18. It should be noted at this point that a distributed amplifier can be utilized here if the pulses received have extremely fast rise times.

The output of cathode follower 224 is taken from its cathode and capacitively coupled via terminal NN to the grid of tube 226 which, together with tube 228, make up the Ramp Blocking Oscillator 14, which is of conventional design. Any well known ramp signal generator may be substituted for the Ramp Blocking Oscillator 14 so long as it has linear slope characteristics. The output of the Blocking Oscillator 14 is taken from the plate of tube 228 and capacitively coupled to the anode of diode 230 which, together with diode 232 and associated resistors 234, 236 and 238 makes up the Ramp Generator 19.

The Ramp Generator 19 develops a ramp voltage waveform, which is graphically shown in FIG. 2, as waveform 20. This waveform 20 is taken from the junction of the cathodes of diodes 230 and 232 (terminal B) and capacitively coupled to the cathode of diode 240 which makes up the Diode Comparator 22. A varying DC feedback voltage is applied to the anode of diode 240 for controlling the clipping level thereof. A description of the development of the DC feedback voltage is set forth below. Thus, depending upon the amplitude of the DC feedback voltage, more or less of the ramp signal 20 will be passed by diode 240.

The output of Diode Comparator 22 is taken from the plate of diode 240 and capacitively coupled to the grid of tube 242 which, along with its associated resistors, makes up the Ramp Amplifier 26. Waveform 30 of FIG. 2 represents the output of Ramp Amplifier 26 which is taken from the plate of tube 242 (terminal C) and capacitively coupled to the grid of tube 244 which, along with tube 246 and their associated resistors, condensers, and transformer, constitute the Early-Late Gate Generator 28 which is a conventional blocking oscillator.

Gate Generator 28 develops complementary signals 40 and 50 as shown in FIG. 2 and which respectively appear on terminals D and E and respectively control the gating of pulse 10 through the Early and Late AND Gates 32 and 34.

Early AND Gate 32 comprises diodes 247 and 248 and resistors 250 and 252, whereas Late AND Gate 34 comprises diodes 254 and 256 and resistors 250 and 258. The complementary signals 40 and 50 are respectively taken from the plate and cathode of tube 246 and capacitively coupled to the cathodes of diodes 247 and 254, respectively. Thus, when tube 246 is not conducting, the potential at terminal D will be high whereas the potential at terminal E will be low. This causes diode 247 to be back biased and diode 254 to be forward biased. Also, diodes 248 and 256 are highly forward biased by the application of a high positive voltage via resistors 252 and 258, respectively. Looking now to terminal 00 without regard to the nature of any signal present thereon, when tube 246 is not conducting any signal applied to terminal 00 will be coupled to terminal RR whereas such signal will not appear at terminal SS since diodes 254 and 256 are forwardly biased. However, when tube 246 is conducting, i.e., after ramp signal 30 crosses the firing level 38 of tube 244, diode 247 is now forwardly biased and diode 254 reversed biased. Any signal now present at terminal 00 will be coupled to terminal SS whereas such signal will not be coupled to terminal RR since diodes 247 and 248 are forwardly biased.

Referring again to the cathode of tube 222 of the Pulse Video Amplifier 18, the pulse present here is also capacitively coupled to Delay Network 16 via switch S3 wherein the pulse experiences a predetermined range delay before it is coupled to the Variable Delay 36. Both Delay Network 16 and Variable Delay 36 are of conventional design.

The output of Variable Delay 36 is take from the cathode of tube 264 and directly coupled to the cathodes of diodes 248 and 256. When complementary signal 40 is high, such as shown at times $t_0$ to $t_{1.0}$ of FIG. 2, Early AND Gate 32 (diodes 247-248) will pass waveform 60 to terminal SS. During this same time period Late AND Gate 34 (diodes 254-256) will not pass waveform 60 to terminal RR. When complementary signals 40 and 50 switch, such as shown at time $t_{1.0}$ to $t_{2.5}$ of FIG. 2, Gate 32 will not pass waveform 60 to terminal SS, whereas Gate 34 will pass waveform 60 to terminal RR. Thus, by proper timing of the switching or triggering of Gate Generator 28, waveform 60 can be partially coupled to terminal RR and partially coupled to terminal SS. Waveforms 70 and 80 of FIG. 2 are respectively present at terminals G and H. It can be seen that the relayed No. 1 pulse 60 has been effectively split into two portions, one portion (70) is capacitively coupled to the grid of tube 266 and the other portion (80) is capacitively coupled to the grid of tube 268. Tubes 266 and 268 along with their associated circuit elements make up the Voltage Amplifiers 42 and 44, respectively.

The output of Voltage Amplifier 42 is taken from the plate of tube 266 and coupled to the grid of tube 270 via serially connected capacitors 272 and 274 and resistor 276; whereas the output of Voltage Amplifier 44 is taken from the plate of tube 268 and coupled to the grid of tube 270 via serially connected capacitor 278, diode 280 and resistor 282. A resistor 284 is connected between the junction of capacitors 272 and 274 and a DC bus line 286. A resistor is connected between the junction of capacitor 278 and diode 280 and the DC bus line 286 while a diode 288 is connected between the junction of capacitor 274 and resistor 276 and the DC bus line 286. The bus line 286 is connected to the slider of potentiometer 290 which, together with capacitor 292, resistor 294, diode 296 and the negative DC voltage, make up the Open Loop bias control 58. The foregoing described circuitry that is connected between the plates of tubes 266 and 268 and the cathode of tube 270 constitute the Linear Integrators 46 and 48, Peak Detectors 52 and 54 and the Summation Network 56. The DC feedback voltage which controls the bias level for the Diode Comparator 22 is taken from the cathode of tube 270 and coupled to the plate of diode 240 via resistor 298.

It will be recalled that it is necessary that the energy in pulses 70 and 80 be equal. It is therefore necessary that when the energy in pulses 70 and 80 are not equal, a net positive or negative change occur in the DC voltage feedback to Diode Comparator 22.

Figure 4A:
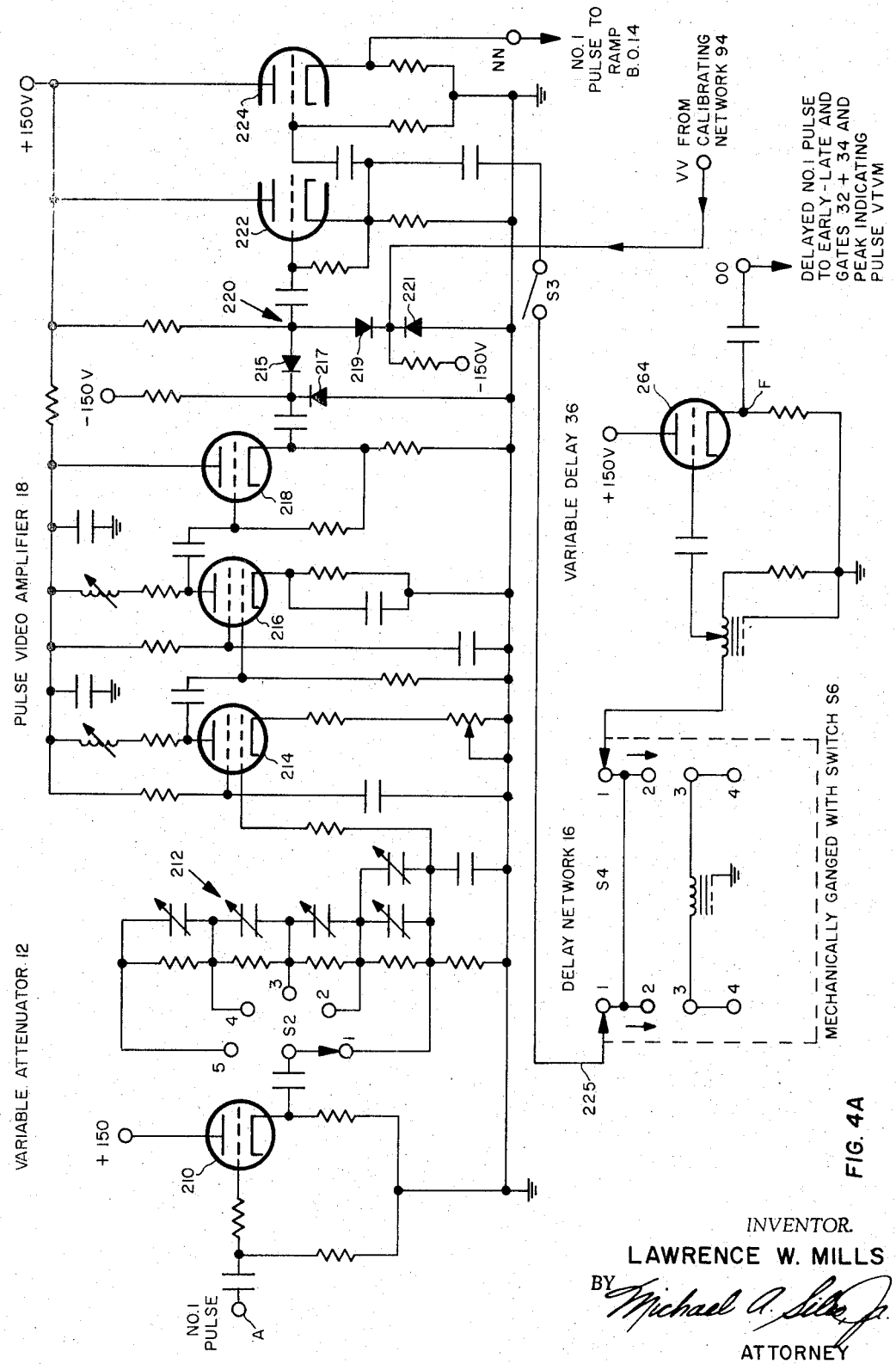
Figure 4B:
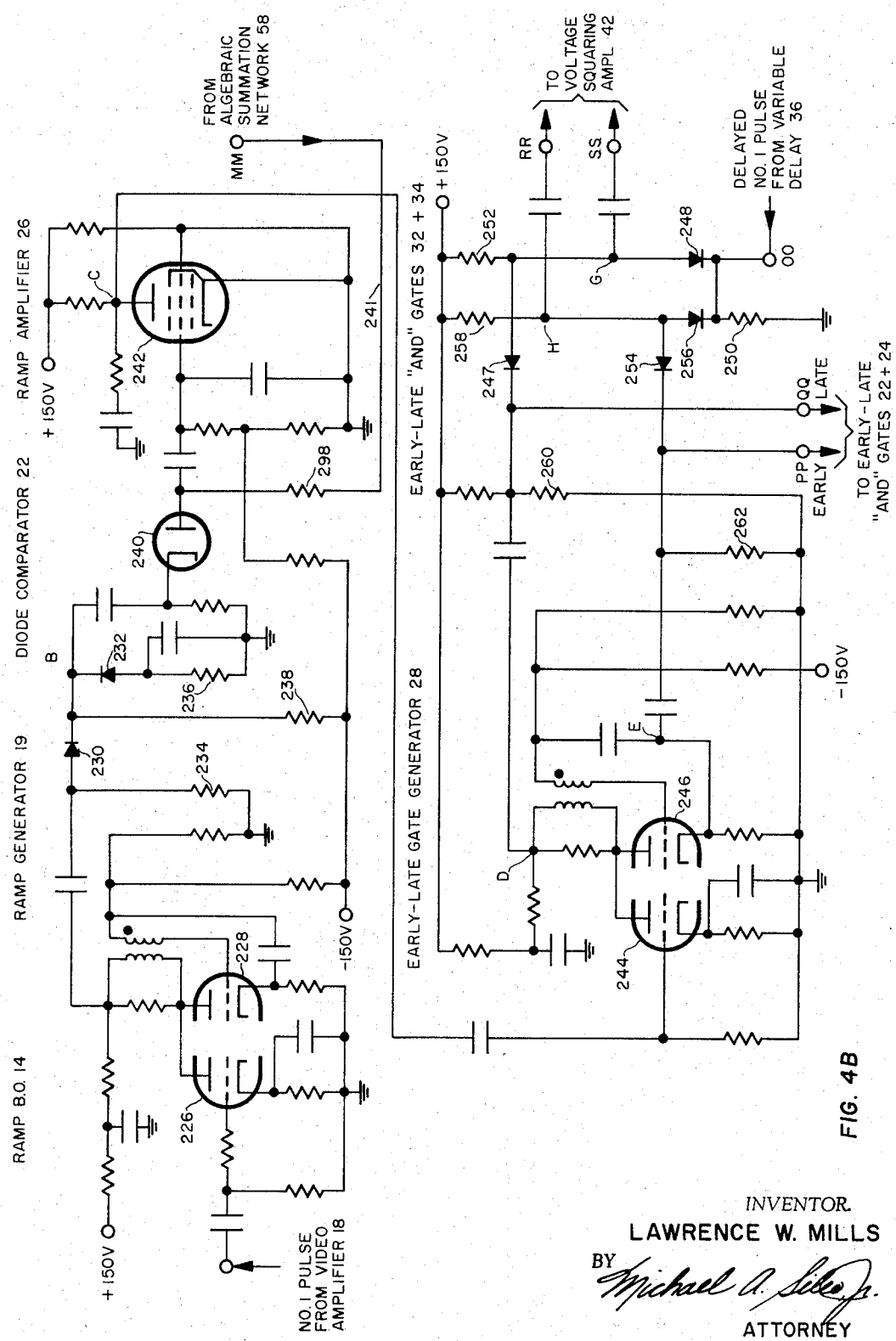
Figure 4C:
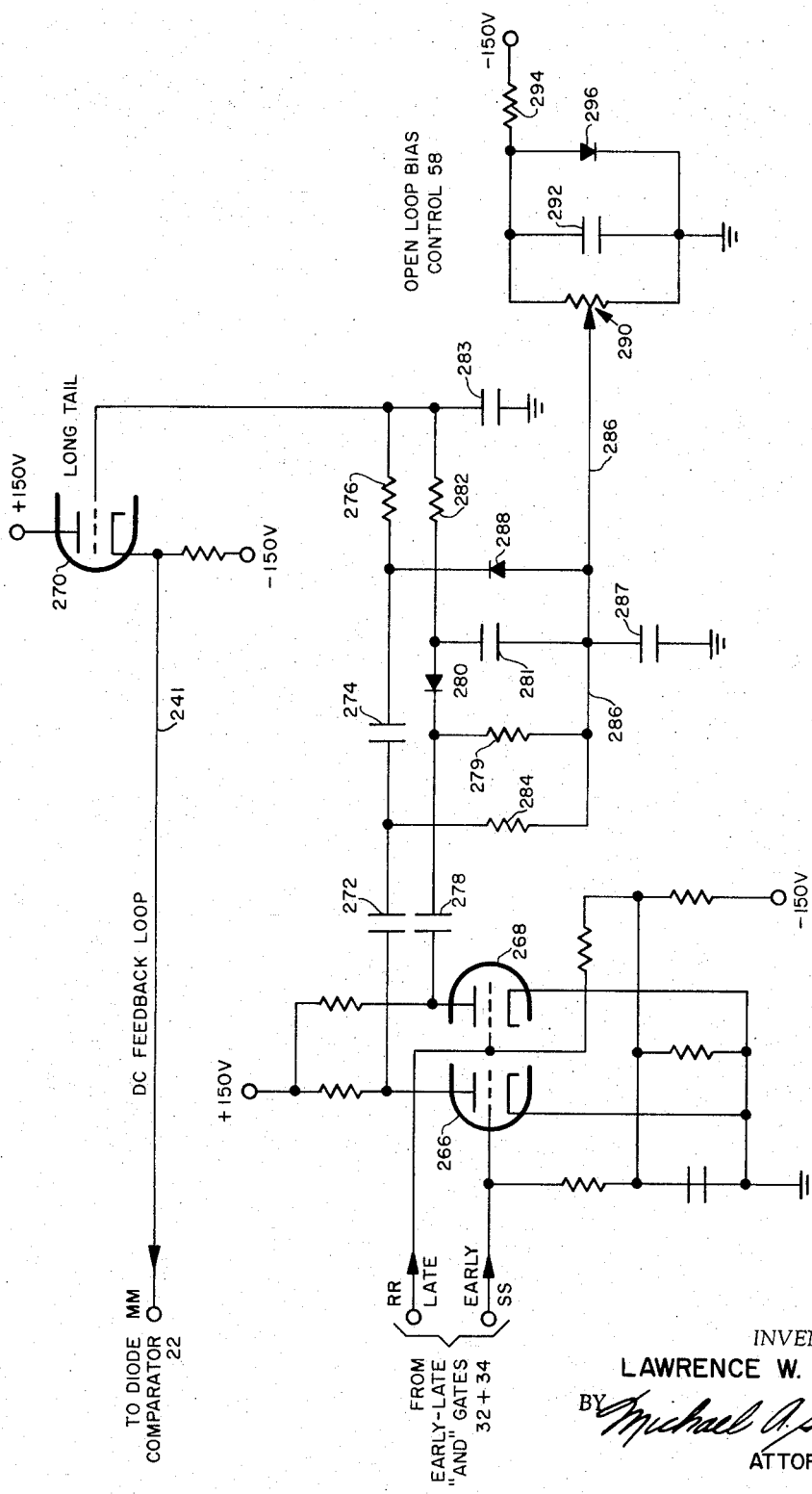

In the circuit of FIG. 4C when the energy in pulse 70 is greater than the energy in pulse 80, a net positive change occurs in the DC feedback voltage; whereas when the energy in pulse 80 is greater than the energy in pulse 70, a net negative change occurs in the DC feedback voltage. The algebraic summation of the discriminated pulses 70 and 80 occurs across resistors 276 and 282 and capacitor 283. The net voltage across the Summation Network 56 is appropriately connected to the long tail cathode follower 270 for coupling this voltage back to the Diode Comparator 22.

As mentioned above, a net positive DC voltage change feedback to the Diode Comparator 22 will cause the Early-Late Gate Generator 28 to fire earlier until the system is balanced, i.e., the energy in pulse 70 equals the energy in pulse 80. Accordingly, the leading edges of complementary signals 40 and 50 are driven to and kept in coincidence with the center of energy of the delayed pulse 60.

Figure 4D:
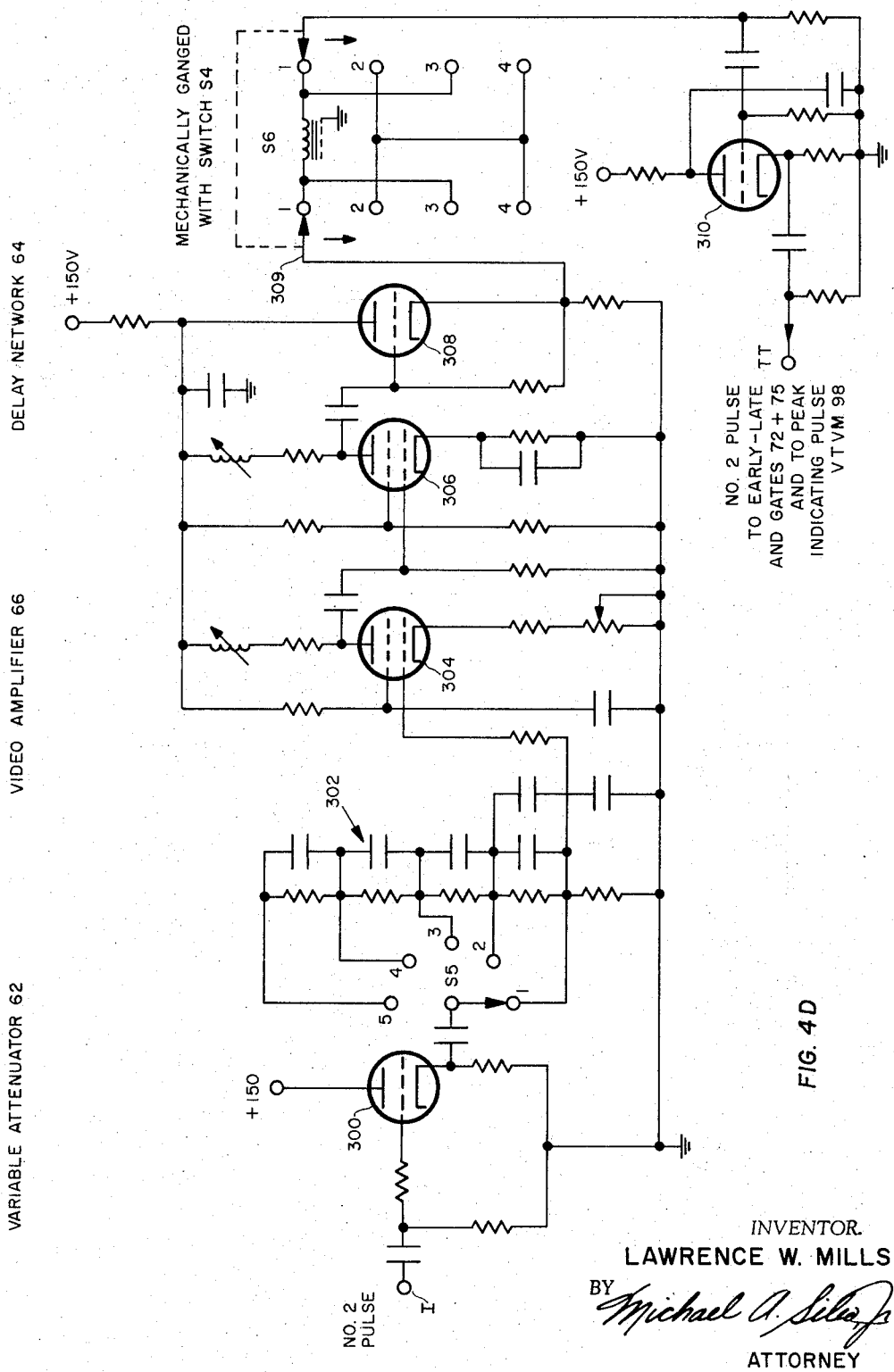

Referring now to FIG. 4D, the No. 2 pulse 90 is coupled to the grid of a cathode follower 300 which, together with attenuator switch S5 and RC network 302, make up the Variable Attenuator 62. By varying switch S5, the amplitude and shape of pulse 90 can be controlled within desired limits. Variable attenuator 62 is preferably frequency compensated.

The output of Variable Attenuator 62 is coupled to the grid of a first video amplifier 304 which has a gain control that overlaps the gain control of the Variable Attenuator 62. The output of the first video amplifier 304 is taken from the plate thereof and capacitively coupled to the grid of a second video amplifier 306, the output of which is taken from the plate thereof and capacitively coupled to the grid of a cathode follower 308. The cathode follower 308 and video amplifiers 304 and 306 and their associated circuit components are of conventional design and have adequate gain-bandwidth characteristics so as to accommodate the No. 2 pulse 90.

The output of the video amplifier 66 is taken from the cathode of cathode follower 308 and directly coupled to the switch S6 which, along with the cathode follower 310 makes up the delay network 64. The switch S6 is mechanically ganged with the switch S4 so that the slider 309 of switch S6 follows the slider 225 of switch S4. Also, the cathode follower 310 is of conventional design. It should be noted at this point that a distributed amplifier can be utilized here if the pulses received have extremely fast rise times.

The output of cathode follower 310 is taken from its cathode and capacitively coupled via terminal TT to the cathodes of diodes 312 and 314. Referring back to the Early-Late Gate Generator 28, the complementary signals 40 and 50 generated thereby are coupled to the cathodes of diodes 316 and 318 via terminals QQ and PP. The diodes 316 and 312 along with resistor 320 make up the Early AND Gate 72; whereas, the diodes 318 and 314 along with resistor 322 make up the Late AND Gate 74. Thus, the complementary signals 40 and 50 as shown in FIG. 2 and which respectively appear at terminals D and E, respectively, control the gating of pulse 90 through the Early and Late AND Gates 72 and 74. Thus, when tube 246 of Gate Generator 28 is not conducting the potential at terminal D will be high thereby causing diode 316 to be back biased and diode 318 to be forward biased. It should be noted that diodes 312 and 314 are highly forward biased by the application of a high positive voltage via resistors 320 and 322, respectively. Looking now at the terminal TT without regard to the nature of any signal present thereon, when tube 246 is not conducting, any signal applied to terminal TT will be coupled to the grid of tube 326; whereas, such signal will not be coupled to the grid of tube 324 since diode 318 is forwardly biased. However, when tube 246 is conducting, i.e., after ramp signal 30 passes the firing level 38 of tube 244, diode 316 is now forwardly biased and diode 318 is reversed biased. Any signal now present at terminal TT will be coupled to the grid of tube 324; whereas such signal will not be coupled to the grid of tube 326 since diode 316 is forwardly biased.

It will be apparent, therefore, that when the complementary signal 40 is high such as shown at times $t_0$ to $t_{1.0}$ of FIG. 2, Early AND Gate 72 (diodes 316 and 312) will pass waveform 90 to the grid of tube 326 and consequently to the terminal K. During this same time period the Late AND Gate 74 (diodes 318 and 314) will not pass waveform 90 to the grid of tube 324 and consequently to the terminal J. When complementary signals 40 and 50 switch such as shown at times $t_{1.0}$ to $t_{2.5}$ of FIG. 2 Gate 72 will not pass waveform 90 to the grid of tube 326 and consequently to terminal K; whereas, Gate 74 will pass waveform 90 to the grid of tube 324 and consequently to the terminal J. Thus, by proper timing of the switching or triggering of Gate Generator 28, waveform 90 can be partially coupled to terminal J via tube 324 and partially coupled to terminal K via tube 326. Waveforms 100 and 110 of FIG. 2 are respectively present at terminals J and K and it can be seen, therefore, that the No. 2 pulse has been effectively split into two portions, one portion (100) being capacitively coupled to the grid of tube 330 and the other portion (110) is capacitively coupled to the grid of tube 328. The tubes 324 and 326 along with their associated components make up the output circuit of the Early-Late AND Gates 72 and 74; whereas the tubes 330 and 328 along with their associated circuit components make up the voltage squaring amplifiers 76 and 78, respectively.

The output of voltage squaring amplifiers 76 is taken from the plate of tube 330 and capacitively coupled to the grid of tube 334; whereas, the output of voltage squaring amplifier 78 is taken from the plate of tube 328 and respectively coupled to the grid of tube 332. The outputs of tubes 332 and 334 are respectively coupled to switch S7 via diodes 336 and 338. A parallel RC circuit comprising resistor 340 and capacitor 342 is coupled between the cathode of diode 336 and ground; whereas, a parallel RC circuit comprising resistor 344 and capacitor 346 is connected between the cathode of diode 338 and ground. The diodes 338 and 336 along with their respective parallel RC circuit make up the peak detectors 86 and 88, respectively; whereas, the plate and load resistances of tubes 330 and 328 along with the capacity respectively between the plates of tubes 330 and 328 and ground, make up the linear integrators 82 and 84, respectively.

When switch S7 is in its normal position, i.e., the arms 341 and 345 respectively engage the terminals 339 and 343, the output of peak detectors 86 and 88 are respectively coupled to the grids of tubes 350 and 348, whose outputs are respectively coupled to the meter 352. It will be apparent, when the outputs of tubes 348 and 350 are equal the meter 352 will have a "0" or null reading. The tubes 348 and 350 and meter 352 along with switch S8, capacitor 354 and meter adjustment potentiometer 356, make up the micro-amp meter circuitry.

It will be recalled that it is necessary that the energy in pulses 100 and 110 be equal. It is, therefore, necessary that when the energy in pulses 100 and 110 are not equal an adjustment must be made so that the leading edges of the complementary signals 40 and 50 not only coincide with the center of energy of pulse 60 but also coincide with the center of energy of pulse 90. By closing switch S7, i.e., putting it in its normal switch position, the meter will indicate whether or not the energy in pulse 100 is greater or less than the energy in pulse 110. Appropriate adjustments in the relative time position of the leading edges of complementary signals 40 and 50 with respect to the time position of pulse 90 must be made. In the present embodiment described with regard to the detailed circuitry of FIGS. 4A–4G, this adjustment is accomplished by delaying the pulse 60 more or less with respect to the reading on meter 352. This is accomplished by appropriately adjusting the variable delay 36 so that pulse 60 may be moved to the left or right with respect to the voltage-time graph of FIG. 2. It should be recalled at this time that when pulse 60 is delayed a finite value the servo loop, which includes the summation network 56, D.C. feedback loop 241 and the diode comparator 22, dynamically develops a net positive or negative change in the DC feedback voltage so as to cause the early-late Gate Generator 28 to fire earlier or later, thereby causing the leading edges of complementary signals 40 and 50 to coincide with the center of energy of delay pulses 60. Thus, when the meter 352 reads zero or null as a result of the adjustment of the variable delay 36, the leading edges of the complementary signals 40 and 50 coincide with the center of energy of pulse 90 and at the same time as a result of the dynamic DC feedback action of the servo loop also coincide with the center of energy of pulse 60. Thus, the amount of delay required to line up pulse 60 and pulse 90 can be translated into a time interval through appropriate calculations utilizing time vs. delay graphs.

Figure 4F:
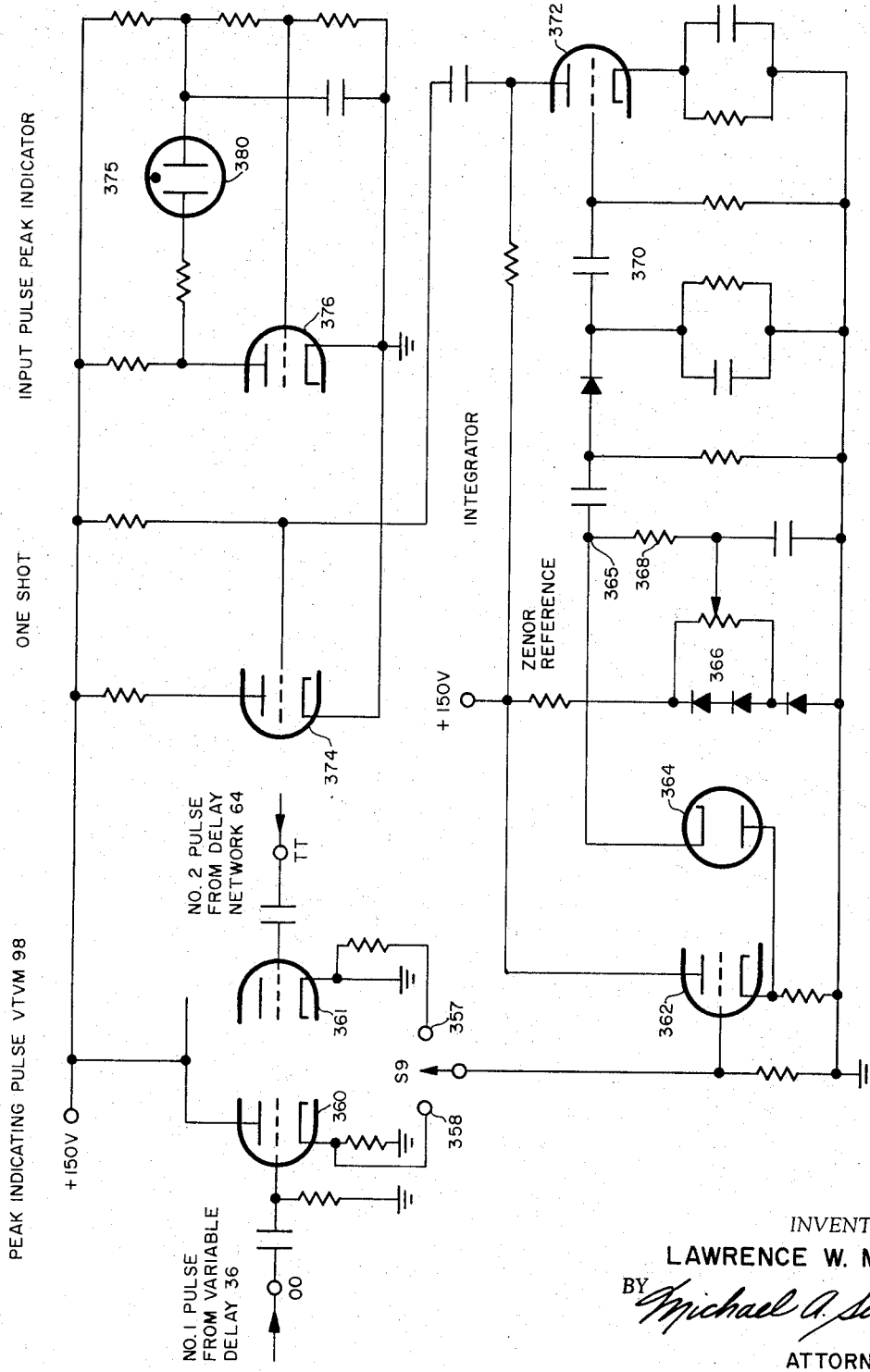

Referring now to FIG. 4F, there is shown a preferred Peak Indicating Pulse VTVM for controlling the amplitude of both the No. 1 pulse 10 and No. 2 pulse 90. Briefly, restating, the time behavior of the early-late gate generator 28 is significantly influenced by the amplitude of the incoming pulses 10 and 90. It is, therefore, necessary to provide means for attenuating the peak amplitude of the incoming pulses 10 and 90 to a desired value and means for adjusting such attenuator. The foregoing desirable characteristics are provided in the preferred embodiment of FIGS. 4A–4G by incorporation of variable attenuator 12 and variable attenuator 62 each in combination with the detailed circuit of FIG. 4F for respective attenuation of incoming pulses 10 and 90. When switch S9 is moved into contact with terminal 358 of switch S9, the delayed pulse 60 is capacitively coupled to the grid of tube 360 via terminal 00. The output of tube 360 is taken from its cathode and coupled directly to the grid of tube 362, whose output is coupled to the plate of a diode 364 wherein the voltage level of the output of tube 362 is compared to a threshold voltage determined by a Zener voltage reference developed across the diode network 366. When the threshold voltage level is exceeded, the voltage appearing across the resistor 368 is integrated in the integrator network 370 and applied to the grid of a high gain amplifier 372.

The output of tube 372 is a relatively wide, highly negative, trigger pulse and is taken from the plate thereof and coupled directly to the grid of tube 374 which, along with tube 376 and their associated circuit components, make up the one-shot multi-vibrator. When the one-shot fires, the neon tube 380 is ionized and caused to glow. Thus, by appropriately adjusting the switch S2 of variable attenuator 12 the neon tube 380 can be appropriately caused to fire whereby the peak amplitude of the pulse 10 is at a desired maximum level. It should be noted at this point that the diode 364 constitutes a fixed-biased diode comparator whose threshold level is determined by the Zener voltage developed across the Zener network 366. It should be noted that it is highly desirable to widen the pulse appearing at junction terminal 365 because the width of the input pulses 10 and 90 may be considerably narrow; for example, less than a few milli-microseconds. Further, due to the inherent gain of the voltage meter system and the accuracy of the threshold reference of the diode comparator 364, the ON–OFF threshold characteristics of the peak indicating pulse VTVM are very sharp, stable and accurate. Additionally, the peak indicating pulse VTVM 98 will satisfactorily operate at the highest peak of an unknown pulse coming into the system and will accurately operate regardless of the sharp rise time or width of these pulses.

When the switch S9 is moved in contact with the terminal 357, the No. 2 pulse 90, which is capacitively coupled to the tube 361 via terminal TT, is directly coupled to the grid of tube 362. Again, as described in detail above with regard to the control of the peak amplitude of pulse 10, the diode comparator 364, Zener network 366, integrator 370, one-shot 374 and the peak indicator 375 function in the same manner so that an indication is provided when the neon tube 380 is ionized thereby enabling a proper adjustment of the variable attenuator 62. Accordingly, by appropriate selection of switch S9 and by appropriate adjustment of switches S2 and S5 the peak amplitude of the pulses 10 and 90 can be controlled, thereby preventing time measurement errors due to excessive peak amplitudes of pulses 10 and 90.

Figure 4G:
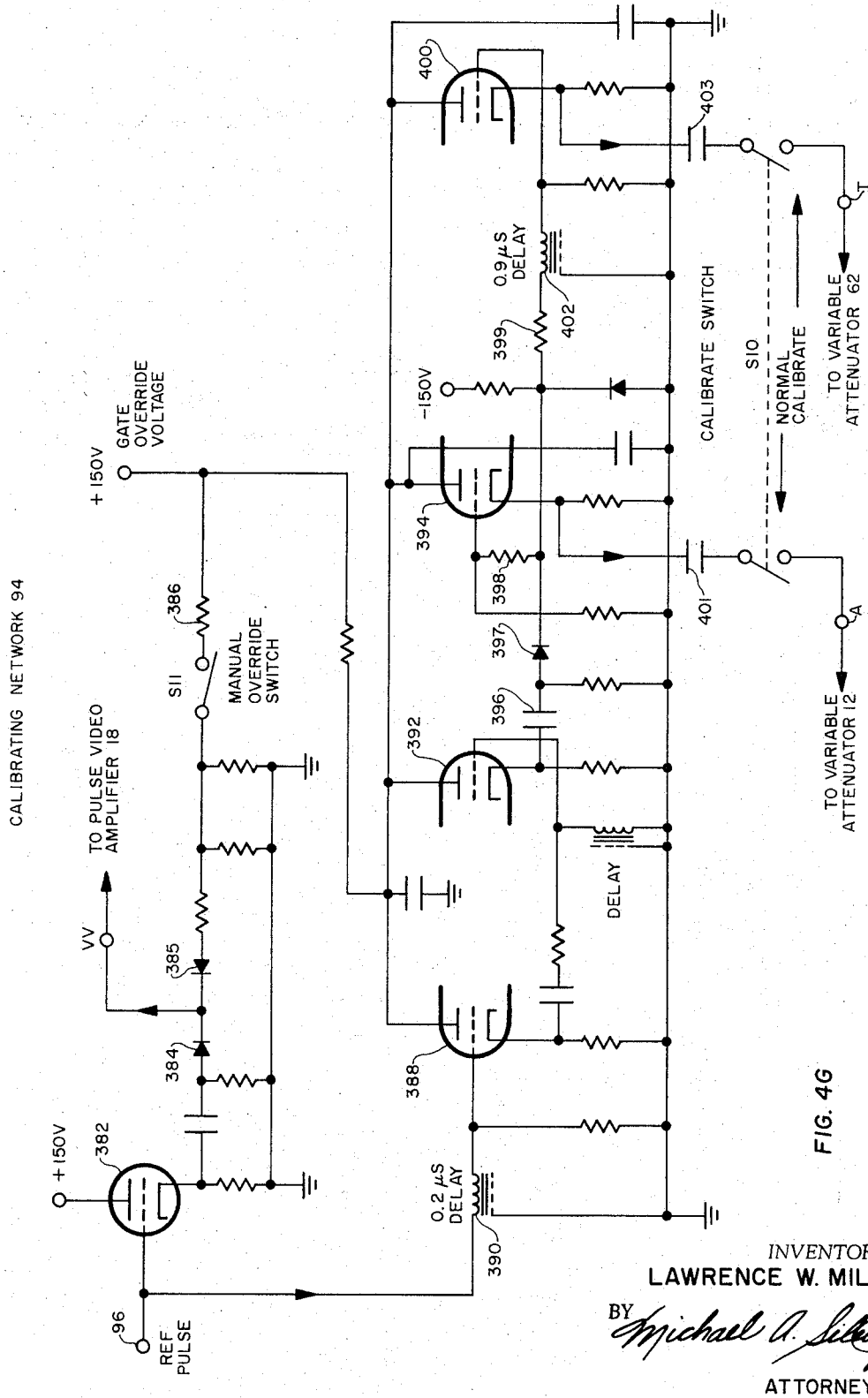

Referring now to FIG. 4G, there is shown a detailed circuit of a preferred embodiment of the Calibrating Network 94. In order to periodically check the accuracy of the time measuring system of the present invention, it is necessary that two pulses having known time separation be inserted into the system at input terminals A and I.

In the detailed embodiment of FIG. 4G, a reference pulse is applied to terminal 96 and coupled to the grid of tube 382. The reference pulse may be generated by any well known pulse generating circuit so long as such circuit can generate pulses similar to input pulses 10 and 90 having highly accurate and reliable waveform characteristics.

The output of tube 382 is taken from the cathode thereof and coupled through diode 384 to terminal VV. It should be noted that terminal VV couples this positive pulse to the cathodes of diodes 219 and 221, which are normally forward biased by a negative source of potential. Thus, when a pulse is present on terminal VV, any pulses introduced into the system at terminal A during a calibration check will be blocked or prevented from propagating through the system since diodes 219 and 221 will shunt such undesirable pulses to ground.

Switch S11 is the manual override switch and along with the positive gate override voltage, which is coupled to switch S11 via resistor 386, forwardly biases the diode 385 when switch S11 is closed. The gate override is provided for reversely biasing the diodes 219 and 221 and inhibiting the diode gate of the Pulse Video Amplifier 18 which comprise diodes 215 and 217 along with diodes 219 and 221. This accordingly prevents any extraneous pulses propagating through the system for passing to the Ramp B.O. 14.

The reference pulse applied to terminal 96 is also coupled to the grid of the tube 388 via the .2 micro-second delay line 390. The output of the tube 388 is coupled to the grid of tube 392 whose output is coupled to the grid of tube 394 via capacitor 396, diode 397 and resistor 398. The output of tube 394 is taken from its cathode and coupled to terminal A via capacitor 401 and switch S10 when in its calibrate position. The .2 micro-second delayed reference pulse is then coupled to the Variable Attenuator 12 wherein it propagates through the system in the same manner as any unknown pulse present on terminal A.

Referring now to the junction of diode 397 and resistor 398, the output pulse taken from the cathode of tube 392 is also coupled to the grid of tube 400 via capacitor 396, diode 397, resistor 399 and the .9 micro-second delay line 402. The output of tube 400 is taken from its cathode and coupled to terminal I via capacitor 403 and switch S10 when in its calibrate position. The 1.1 micro-second delayed reference pulse (.2+.9) is then coupled to the Variable Attenuator 62 whereas it propagates through the system in the same manner as any unknown pulse present on terminal I.

It will be apparent that in order to insure that the reference pulse which is coupled to the Pulse Video Amplifier 18 via terminal VV enables the diode gate thereof, the reference pulse experiences a .2 micro-second delay before it is coupled to terminal A. Also, it can be seen that the reference pulses respectively coupled to terminals A and I represent the input pulses 10 and 90, respectively.

Accordingly, the .9 micro-second delay experienced by the reference pulse before it is coupled to the terminal I represents a delay calibrating standard. Thus, by adjusting the Variable Delay 36 until the Meter 352 reads zero or null, the time difference between the calibrating pulses should be .9 micro-second. The Variable Delay should therefore read .9 micro-second. If it does not, appropriate calibration adjustments can be made before an actual time measurement is made between two unknown time spaced pulses.

It should be noted that appropriate calibration techniques should be utilized to calibrate the delay networks before installing such networks into the system.

The delay lines 390 and 399 are therefore secondary standards (field calibration) and must have highly stable characteristics in order to insure highly accurate secondary calibration of the system. Further, any well known primary as well as secondary calibration techniques may be incorporated herein without departing from the spirit and scope of the present invention.

It will be apparent from the foregoing that the present invention uniquely determines the center of energy of a pulse of energy and provides a capability for accurately measuring the elapsed time between centers of energy of two pulses of energy.

While a specific embodiment of the present invention has been shown and described in both basic and detailed block diagram form and detailed circuitry form, it will, of course, be understood that other modifications are clearly contemplated which would be apparent to persons skilled in the art without departing from the spirit of the invention or the scope of the appended claims.

I claim:
1. A system for locating the center of energy of a pulse of energy comprising, in combination:
(a) a triggered pulse generator having one input and first and second outputs, said pulse generator producing complementary output signals;
(b) first and second gates each having two inputs and one output;
(c) said energy pulse being coupled to one of said inputs of each of said first and second gates;
(d) said complementary output signals being respectively coupled to the other of said inputs of each of said first and second gates for controlling said gates;
(e) first and second energy indicating means respectively coupled to said first and second gates for respectively producing outputs indicative of the energy in said outputs of said first and second gates;
(f) comparing means coupled to said first and second energy indicating means for producing a DC output signal indicative of the energy difference of said outputs of said first and second energy indicating means;
(g) control means coupling said DC signal to said pulse generator for controlling the triggering time of said pulse generator so that the energy in said first gate output equals the energy in said second gate output, whereby said triggering time of said pulse generator indicates the center of energy of said energy pulse;
(h) said first and second energy indicating means each including a squaring amplifier whose voltage output is proportional to the square of the voltage input, which amplifiers are each serially coupled to a linear integrator with said outputs of said first and second gates being respectively coupled to said squaring amplifiers;
(i) said first gate being enabled so that a first portion of said energy pulse is coupled to said squaring amplifier of said first energy indicating means; and
(j) said second gate being enabled so that a second portion of said energy pulse is coupled to said squaring amplifier of said second energy indicating means.

2. A system for locating the center of energy of a pulse of energy comprising, in combination:
(a) a triggered bistable gate generator having one input and first and second outputs, said gate generator producing a first pair of complementary output signals when in one stable state and a second pair of complementary output signals when in its other stable state;
(b) early and late gates each having two inputs and one output;
(c) said energy pulse being coupled to one input of each of said early and late gates;
(d) said first and second outputs of said gate generator being respectively coupled to the other inputs of each of said early and late gates;
(e) said first pair of complementary signals enabling said early gate and inhibiting said late gate so that a first portion of said energy pulse passes through said early gate, and said second pair of complementary signals enabling said late gate and inhibiting said early gate so that a second portion of said energy pulse passes through said late gate;
(f) first and second energy indicating means respectively coupled to said early and late gates for respectively producing outputs indicative of the energy respectively in said first and second portions of said energy pulse;
(g) summation means coupled to said early and late gates for producing a DC signal indicative of the energy difference of said first and second portions of said energy pulse;

(h) triggering means coupled to said gate generator for triggering said gate generator at variable times;

(i) means for coupling said DC signal of said summation means to said triggering means for controlling the triggering time of said gate generator so that the energy in said first portion of said energy pulse equals the energy in said second portion of said energy pulse, whereby said triggering time is indicative of the center of energy of said energy pulse;

(j) said first and second energy indicating means each including a squaring amplifier whose voltage output is proportional to the square of the voltage input, which amplifiers are each serially coupled to a linear integrator; and (k) said first and second portions of said energy pulse being respectively coupled to said squaring amplifiers of said first and second energy indicating means.

3. A system for locating the center of energy of an input pulse comprising, in combination:

(a) a triggered ramp generator for producing a ramp-shaped signal;

(b) said input pulse being coupled to said ramp generator for triggering said ramp generator;

(c) a comparator having first and second inputs and an output, said comparator producing an output only when the voltage level at said first input exceeds the voltage level at said second input;

(d) said ramp signal being coupled to said first input of said comparator;

(e) a triggered gate generator having one input and first and second outputs which are complementary;

(f) said output of said comparator being coupled to trigger said gate generator;

(g) early and late gates each having first and second inputs and an output;

(h) said first output of said gate generator being coupled to said early gate first input for enabling said early gate before said gate generator is triggered, and said second output of said gate generator being coupled to said late gate first input for enabling said late gate after said gate generator is triggered;

(i) said input pulse being also coupled to said second inputs of said early and late gates;

(j) said early gate producing an output indicative of said input pulse during the time period before said gate generator is triggered, and said late gate producing an output indicative of said input pulse during the time period after said gate generator is triggered;

(k) first and second voltage square law responsive and integrating means respectively coupled to said early and late gate outputs for respectively producing outputs indicative of the energy in said early and late gate outputs;

(l) DC summation means coupled to said first and second voltage squaring and integrating means for producing a DC signal indicative of the energy difference of said outputs of said first and second voltage squaring and integrating means; and (m) said summation means output being coupled to said comparator second input for varying the triggering time of said gate generator so that the energy in said early and late gate outputs are equal, whereby said triggering time of said gate generator is indicative of the center of energy of said input pulse.

4. A system for measuring the time interval between the centers of energy of first and second energy pulses comprising, in combination:

(a) dividing means for dividing each of said first and second energy pulses into two portions;

(b) comparing means coupled to said dividing means for comparing the energy in each of said two portions of said first energy pulse;

(c) control means coupled to said dividing means and to said comparing means for controlling said dividing means in response to said comparing means so that said first energy pulse is divided into two equal portions, whereby the time division of said first energy pulse represents the center of energy of said first energy pulse;

(d) measuring means coupled to said dividing means for indicating the relative energies of said two portions of said second energy pulse;

(e) delay means coupled to said dividing means for delaying said first energy pulse until the centers of energy of said first and second energy pulses are coincident, as indicated by said measuring means, so that said dividing means will divide each of said first and second energy pulses into two equal portions, whereby the total delay of said first energy pulse proportionally represents the time interval between the centers of energy of said first and second energy pulses;

(f) said dividing means including first and second energy indicating means for respectively producing an output indicative of the energy in said two portions of said first energy pulse;

(g) said dividing means further including a gate generator for producing first and second output signals and first and second gates respectively coupled between said gate generator and said first and second energy indicating means, said first and second gates being respectively triggered by said first and second signals produced by said gate generator;

(h) said comparing means producing a DC output signal indicative of the energy difference of said outputs produced by said first and second energy indicating means;

(i) said control means coupling said DC signal to said dividing means;

(j) said dividing means further including third and fourth energy indicating means for respectively producing an output indicative of the energy in said two portions of said second energy pulse;

(k) said measuring means differentially comparing the energy of said two portions of said second energy pulse;

(l) said gate generator being a triggered bistable blocking oscillator;

(m) said first, second, third and fourth energy indicating means each including voltage square law responsive and integrating means.

5. A system in accordance with claim 4, wherein:

(a) said dividing means includes gate generator means having one input and first and second outputs, said generator producing first and second output signals;

(b) said dividing means further includes two pairs of gates with each gate having two inputs and one output;

(c) said first energy pulse being coupled to one of said inputs of each gate of said first pair of gates, and said second energy pulse being coupled to one of said inputs of each gate of said second pair of gates;

(d) said first output signal of said gate generator being coupled to said other input of one gate of said first and second pairs of gates, and said second output signal of said gate generator being coupled to said other input of the other gate of said first and second pairs of gates;

(e) said pairs of gates respectively producing said two portions of said first and second energy pulses at their respective outputs;

(f) said two portions of said first energy pulse being coupled from said outputs of said first pair of gates to said comparing means for producing a control voltage;

(g) said control voltage being coupled to said control means whereby said control means causes said dividing means to produce said two equal portions of said first energy pulse respectively at said outputs of said first pair of gates; and (h) said two portions of said second energy pulse being coupled from said outputs of said second pair of gates to said measuring means for indicating the relative energies of said two portions of said second energy pulse.

6. A system for measuring the time interval between the centers of energy of first and second energy pulses comprising, in combination:

(a) a triggered pulse generator having one input and first and second outputs, said pulse generator producing first and second output signals;

(b) first and second pairs of gates each having two inputs and one output;

(c) said first energy pulse being coupled to one of said inputs of each gate of said first pair of gates, and said second energy pulse being coupled to one of said inputs of each gate of said second pair of gates;

(d) said first output signal of said pulse generator being coupled to said other input of one gate of said first and second pairs of gates and said second output signal of said pulse generator being coupled to said other input of the other gate of said first and second pairs of gates;

(e) first and second energy indicating means respectively coupled to said first pair of gates for respectively producing outputs indicative of the energy in said outputs of each gate of said first pair of gates;

(f) third and fourth energy indicating means respectively coupled to said second pair of gates for respectively producing outputs indicative of the energy in said outputs of each gate of said second pair of gates;

(g) comparing means coupled to said first and second energy indicating means for producing a DC output signal indicative of the energy difference of said outputs of said first and second energy indicating means;

(h) control means coupling said DC signal to said pulse generator for controlling the triggering time of said pulse generator so that the energies in said first and second energy indicating means are equal;

(i) measuring means coupled to said third and fourth energy indicating means for indicating the relative energies of said outputs of said third and fourth energy indicating means;

(j) delay means coupled to said first and second energy indicating means for delaying said first energy pulse until the centers of energy of said first and second energy pulses are coincident, whereby the total delay of said first energy pulse proportionally indicates the time interval between the center of energy of said first and second energy pulses;

(k) said pulse generator being a triggered bistable blocking oscillator;

(l) said first, second, third and fourth energy indicating means each including a squaring amplifier whose voltage output is proportional to the square of the voltage input, which squaring amplifiers are each serially coupled to a linear integrator;

(m) said outputs of said first and second pairs of gates being coupled to respective squaring amplifiers of said first, second, third and fourth energy indicating means; and (n) said meter means differentially comparing the energy of said outputs of said third and fourth energy indicating means.

7. A system in accordance with claim 6, wherein:

(a) one gate of each of said first and second pairs of gates being enabled so that a first portion of said first and second energy pulses is coupled to the respective squaring amplifier of said first and third energy indicating means; and (b) the other gate of each of said first and second pairs of gates being enabled so that a second portion of said first and second energy pulses is coupled to the respective squaring amplifier of said second and fourth energy indicating means.

8. A system in accordance with claim 7, wherein:

(a) said comparing means is an algebraic summation network;

(b) said measuring means is a DC differential meter; and (c) said delay means is a calibrated variable delay line.

9. A system for measuring the time interval between the centers of energy of first and second energy pulses comprising, in combination:

(a) a triggered bistable gate generator having one input and first and second outputs, said gate generator producing a first pair of complementary output signals when in one stable state and a second pair of complementary output signals when in its other stable stable;

(b) first and second early gates and first and second late gates, each gate having two inputs and one output;

(c) said first energy pulse being coupled to one input of each of said first early and late gates, and said second energy pulse being coupled to one input of each of said second early and second late gates;

(d) said first and second outputs of said gate generator being respectively coupled to the other inputs of said first early and late gates and to the other inputs of said second early and late gates;

(e) said first pair of complementary signals enabling said first and second early gates and inhibiting said first and second late gates so that a first portion of said first and second energy pulses respectively pass through said first and second early gates, and said second pair of complementary signals enabling said first and second late gates and inhibiting said first and second early gates so that a second portion of said first and second energy pulses respectively pass through said first and second late gates;

(f) first and second energy indicating means respectively coupled to said first early and late gates for respectively producing outputs indicative of the energy respectively in said first and second portions of said first energy pulse;

(g) third and fourth energy indicating means respectively coupled to said second early and late gates for respectively producing outputs indicative of the energy respectively in said first and second portions of said second energy pulse;

(h) summation means coupled to said first early and late gates for producing a DC signal indicative of the energy difference of said first and second portions of said first energy pulse;

(i) triggering means coupled to said gate generator for triggering said gate generator at variable times;

(j) means for coupling said DC signal of said summation means to said triggering means for controlling the triggering time of said gate generator so that the energy in said first portion of said first energy pulse equals the energy in said second portion of said first energy pulse;

(k) measuring means coupled to said third and fourth energy indicating means for indicating the relative energies of said first and second portions of said second energy pulse;

(l) delay means coupled to said first and second energy indicating means for delaying said first energy pulse until the first portions of said first and second energy pulses are respectively equal to the second portions of said first and second energy pulses, whereby the total delay of said first pulse proportionally indicates the time interval between the centers of energy of said first and second energy pulses;

(m) said gate generator being a triggered bistable blocking oscillator;

(n) said first, second, third and fourth energy indicating means each including a squaring amplifier whose voltage output is proportional to the square of the voltage input, which squaring amplifiers are each serially coupled to a linear integrator; and (o) said first portions of said first and second energy pulses being respectively coupled to said squaring amplifiers of said first and third energy indicating means and said second portions of said first and second energy pulses being respectively coupled to said squaring amplifiers of said second and fourth energy indicating means.

10. A system in accordance with claim 9, wherein:
(a) said summation means is a DC algebraic summation network;
(b) said measuring means is a DC differential meter; and
(c) said delay means is a calibrated variable delay line.

11. A system in accordance with claim 10 wherein:
(a) said triggering means includes a triggered ramp generator having an input and an output for producing a ramp-shaped signal, and a comparator having first and second inputs and an output for controlling the triggering time of said gate generator;

(b) said first energy pulse being also coupled to said input of said ramp generator for triggering said ramp generator;

(c) said ramp signal being coupled to said first input of said comparator, and said DC signal of said summation network being coupled to said second input of said comparator; and (d) said comparator being adapted to produce an output only when the voltage level at its first input exceeds the voltage level at its second input, whereby said gate generator will be triggered when the voltage level of said ramp signal exceeds the voltage level of said DC signal.

References Cited
UNITED STATES PATENTS 3,005,165    10/1961    Lenigan.
3,118,109    1/1964    Rabow et al. _____ 324—68

RUDOLPH V. ROLINEC, *Primary Examiner.*

WALTER L. CARLSON, *Examiner.*

P. F. WILLE, *Assistant Examiner.*